(12) United States Patent
Garcia Correa

(10) Patent No.: US 11,882,143 B1
(45) Date of Patent: Jan. 23, 2024

(54) CYBERSECURITY SYSTEM AND METHOD FOR PROTECTING AGAINST ZERO-DAY ATTACKS

(71) Applicant: Threat Inc., Bellingham, WA (US)

(72) Inventor: Jesus Guadalupe Garcia Correa, Bellingham, WA (US)

(73) Assignee: Reveald Holdings Inc., New York, NY (US)

( * ) Notice: Subject to any disclaimer, the term of this patent is extended or adjusted under 35 U.S.C. 154(b) by 343 days.

(21) Appl. No.: 17/395,453

(22) Filed: Aug. 5, 2021

Related U.S. Application Data

(60) Provisional application No. 63/061,751, filed on Aug. 5, 2020.

(51) Int. Cl.
 *H04L 9/40* (2022.01)
 *G06F 9/455* (2018.01)

(52) U.S. Cl.
 CPC ...... *H04L 63/1433* (2013.01); *G06F 9/45558* (2013.01); *H04L 63/1416* (2013.01); *H04L 63/1425* (2013.01); *H04L 63/20* (2013.01); *G06F 2009/45587* (2013.01); *G06F 2009/45595* (2013.01)

(58) Field of Classification Search
 None
 See application file for complete search history.

(56) References Cited

U.S. PATENT DOCUMENTS

| | | | | |
|---|---|---|---|---|
| 2018/0026995 | A1* | 1/2018 | Dufour | H04W 12/128 726/23 |
| 2022/0166783 | A1* | 5/2022 | Yavo | H04L 63/1425 |

\* cited by examiner

*Primary Examiner* — Cai Y Chen
(74) *Attorney, Agent, or Firm* — John J. Bamert, Esq.; Bamert Regan PLLC

(57) ABSTRACT

Embodiments are directed toward a non-transitory processor-readable medium for providing a zero-day attack prevention cybersecurity system, including an agent and an orchestrator. The agent is configured to be installed at an endpoint within a network to be evaluated. The endpoint has a cybersecurity solution to be tested. The orchestrator is enables standardized tactics, techniques, and procedures ("TTPs") and non-standard TTPs to be sent across the network to the endpoint. The agent is configured to limit network communication outgoing from the endpoint to predefined or selected communications while the agent is installed at the endpoint. Accordingly, the agent and the orchestrator cooperatively enable testing the cybersecurity solution of the endpoint with respect to both the standardized TTPs and the non-standard TTPs without exposing other endpoints in communication with the network to security risks posed by the standardized TTPs and the non-standard TTPs sent to the endpoint.

12 Claims, 24 Drawing Sheets

Packages

| Name | Package Phase Attack | Owner | Created | Updated | |
|---|---|---|---|---|---|
| Dark Tequila | Privilege Escalation | angeles.victor@rthreat.com | 08/07/2020 03:47 | 08/07/2020 03:47 | Details |
| pBotMiner | Command and Control | angeles.victor@rthreat.com | 08/07/2020 01:30 | 08/07/2020 01:30 | Details |
| District Test | Execution | angeles.victor@rthreat.com | 07/07/2020 10:23 | 07/07/2020 10:23 | Details |
| PP-Tst | Persistence & Execution | angeles.victor@rthreat.com | 07/07/2020 05:43 | 07/07/2020 05:43 | Details |
| Ana-tst1 | Persistence & Execution | angeles.victor@rthreat.com | 07/07/2020 12:31 | 07/07/2020 12:31 | Details |
| Snake-test | Persistence & Execution | angeles.victor@rthreat.com | 06/07/2020 06:25 | 06/07/2020 06:25 | Details |
| prueba2 | Collection | admin@rthreat.com | 01/07/2020 06:24 | 01/07/2020 06:24 | Details |
| HolaTestX | Execution | IsraelUsuario@rthreat.com | 29/06/2020 06:17 | 29/06/2020 06:17 | Details |
| pack-03-testexec | Credential Access | admin@rthreat.com | 29/06/2020 01:42 | 29/06/2020 01:42 | Details |
| pack-02-exec | Defense Evasion | admin@rthreat.com | 29/06/2020 01:42 | 29/06/2020 01:42 | Details |

FIG. 4

Information

| | |
|---|---|
| Ext. | .exe |
| Size | 152064 |
| Type | Exec |
| Hash | b8121ce0391711d9b91225af19b092b0 |
| Created | 23/06/2020 11:27 |
| Modified | 23/06/2020 11:27 |
| Mitre Attack | Execution & Lateral Movement & Command and Control |
| Artifact Description | This Ransomware, which targeted computers running the Microsoft Windows operating system by encrypting data and demanding ransom payments in the Bitcoin cryptocurrency. It propagated through insiders an exploit developed by the system for new Windows systems. It is considered a network worm because it also includes a "transport" mechanism to automatically spread itself. This transport code scans for vulnerable systems. |
| Callback | true |
| Force Network CyberSecurity | false |

Execution Type* ▾

[Save] [Delete]

---

Ext. Allowed For A New File (.bat, .com, .exe, .xlsx, .docx o .doc)

[CHOOSE A FILE]   Drag and drop the file here

Choose A Threat Type ▾

Risk ▾

MITRE Phase Attack

Description File* ⁄⁄

Hidden Options

☐ Callback?
☐ Force Network CyberSecurity Evasion?

[Save] [Cancel]

FIG. 7

Status Execution

| Agent | Status | Advanced Results | Created | Updated |
|---|---|---|---|---|
| AZTEC1-V | 1 | Execution Results | 06/07/2020 06:26 | 06/07/2020 06:29 |

Files Execution Result

| Agent | File | Start | Finish | Network Security Avoided? | C2 | Executed File? | Attack Phase Execution Results | Attack Description Package | Error |
|---|---|---|---|---|---|---|---|---|---|
| AZTEC1-V | SNAKE-ransomware.exe | 06/07/2020 06:29:27 p.m. | 06/07/2020 06:29:38 p.m. | ture | - | ture | Description Success | Description File Snake-test | No Errors |

Package Description For In Execution

Snake-test

Persistence consists of techniques that adversaries use to keep access to systems across restarts, changed credentials, and other interruptions that could cut off their access. Also adversary might use a remote access tool to run a PowerShell csript that does Remote System Discovery. First seen at the end of 2019, using AES-256 and RSA-2048 encryption and a high level of obfuscation; the SNAKE doesn't effect the operating system files and programs necessary to continue operating. However, all important files for the user such as documents, spreadsheets, photos, videos, music or any other files important to the targeted organization are encrypted with a random encryption key. This ransomeware uses a random key to encrypt the file, using a symmetric encryption. Then uses a public key to lock up the random key, it will stop numerous processes like antivirus software and perform the deletion of volume shadow copies. This behaviour ensure that data cannot be restored with ease. After encryption is performed a note named "Decrypt-Your-Files" is presented with the information of how to "recover the files" in which now five randomly generated characters have been appended behind the original file extension of the encrypted file.

MITRE Attack Applied

Persistence & Execution Snake-test

Persistence consists of techniques that adversaries use to keep access to systems across restarts, changed credentials, and other interruption that could cut off their access. Also adversary might use a remote access tool to run a PowerShell script that does Remote System Discovery.

FIG. 12

CYBERSECURITY SYSTEM AND METHOD FOR PROTECTING AGAINST ZERO-DAY ATTACKS

CROSS-REFERENCE TO RELATED APPLICATIONS

This application claims the benefit of U.S. Provisional Application No. 63/061,751, filed Aug. 5, 2020, titled "CYBERSECURITY SYSTEM AND METHOD FOR PROTECTING AGAINST ZERO-DAY ATTACKS", which is hereby incorporated by reference in its entirety.

TECHNICAL FIELD

The present disclosure generally relates to systems and methods for analysis and prevention of cyberattacks, and particularly, to systems and methods for analysis and prevention of zero-day cyberattacks.

BACKGROUND

Description of the Related Art

The considerable utilization of the Internet and other networking systems in today's world has been a significant technological improvement to a wide range of businesses and technologies. Unfortunately, the ubiquity of the Internet and other networking systems has also created increased technological problems with respect to cyberattacks and other cybersecurity concerns.

Accordingly, there is an ever-increasing need for systems and methods to prevent cybersecurity attacks and otherwise bolster cybersecurity defenses. While many systems attempt to help computer systems defend themselves against known types of attacks, there is a lack of cybersecurity systems that are designed to prevent new types of cyberattacks, which are sometimes referred to as zero-day attacks, since it has been zero days from when such an attack was first launched. There is a continuing need in the art for cybersecurity systems that can help defend against such zero-day attacks.

The present disclose addresses this and other needs.

BRIEF SUMMARY

The Zero-day Attack Prevention Cybersecurity System enables companies to understand, communicate, and support the effectiveness of cybersecurity solutions using quantifiable data based on real and continuous evidence. This paradigm shift elevates cybersecurity perception from a "magic black box" to a metrics-based business unit.

The Zero-day Attack Prevention Cybersecurity System, through an agent installed on the endpoint containing the organization's gold image which communicates with the Orchestrator, can receive advanced threats that correspond to different attack standards, making it possible to truly evaluate the effectiveness of deployed security solutions.

The Zero-day Attack Prevention Cybersecurity System also has a set of non-standard Tactics, Techniques and Procedures (TTPs). In some embodiments, the non-standard TTPs that emulate those used by attack groups and that are undetectable by traditional security solutions. These TTPs developed by the Zero-day Attack Prevention Cybersecurity System can be considered zero-day. For example, the system may use artificial intelligence such as machine learning to evaluate recent attacks and thus generate non-standard TTPs that emulate the recent attacks. As another example, the system may use machine learning to evaluate the recent attacks and to generate new TTPs based on packets uniquely generated by the machine learning algorithm after it has been taught to generate TTPs based on a set of recent or previously known attacks. In other embodiments, the system uses the actual recent attacks as the non-standard TTPs, which are thus zero-day because the recent attacks are zero-day attacks that have not yet been represented in a publicly known and predefined third-party framework such as the MITER framework. In some embodiments, the system encrypts the non-standard TTPs (for example, encryption utilizing an asymmetric cryptographic algorithm such as Rivest-Shamir-Adleman (RSA)) to further challenge cybersecurity solutions (e.g., detection software). When the non-standard TTPs are available to your organization, it's possible to validate not only the effectiveness of the infrastructure against an on-demand security breach, but also the effectiveness of your incident response group.

The above objectives and others that will be apparent from the detailed description are achieved by providing a non-transitory processor-readable medium for providing a zero-day attack prevention cybersecurity system, including an agent and an orchestrator. The agent is configured to be installed at an endpoint within a network to be evaluated. The endpoint has a cybersecurity solution to be tested, such as malware detection or a firewall. The orchestrator facilitates standardized tactics, techniques, and procedures ("TTPs") and non-standard TTPs to be sent across the network to the endpoint. The agent is configured to limit network communication outgoing from the endpoint to predefined or selected communications while the agent is installed at the endpoint. Accordingly, the agent and the orchestrator cooperatively enable testing the cybersecurity solution of the endpoint with respect to both the standardized TTPs and the non-standard TTPs without exposing other endpoints in communication with the network to security risks posed by the standardized TTPs and the non-standard TTPs sent to the endpoint.

In some embodiments, the standardized TTPs are communicated to the endpoint with packets that have a standardized artifact according to a publicly known and predefined third-party framework. In some embodiments, the non-standard TTPs are communicated to the endpoint with packets that have an artifact that is absent from the framework.

In some embodiments, the artifact of the non-standard TTPs has been generated by an artificial-intelligence algorithm trained with a cybersecurity attack having a TTP that has not yet been included in the framework. In some embodiments, the non-standard TTPs includes malware having at least one artifact that has not yet been included in the framework. In some embodiments, the packets of the non-standard TTPs communicated to the endpoint are encrypted.

In some embodiments, the orchestrator is configured to obtain information from the agent regarding action of the cybersecurity solution in response to the standardized TTPs and the non-standard TTPs. In some embodiments, the orchestrator is configured to communicate to a human-machine interface validation information or measurement information regarding strength of security provided to the endpoint by the cybersecurity solution based on the information obtained from the agent.

The above objectives and others that will be apparent from reading the detailed description are achieved by performing a method of using the medium for providing a zero-day attack prevention cybersecurity system. A virtual machine is preferably installed at the endpoint. The agent is preferably installed on the virtual machine. The orchestrator is preferably utilized to facilitate sending standardized tactics, techniques, and procedures ("TTPs") and non-standard TTPs to be sent across the network to the endpoint. The agent limits network communication outgoing from the endpoint to predefined or selected communications while the agent is installed at the endpoint. Accordingly, the agent and the orchestrator cooperatively enable testing the cybersecurity solution of the endpoint with respect to both the standardized TTPs and the non-standard TTPs without exposing other endpoints in communication with the network to security risks posed by the standardized TTPs and the non-standard TTPs sent to the endpoint.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 4 is diagram of listed packages and package parameters, according to one or more embodiments.

FIG. 7 is a diagram of the threat analysis advanced network cyber security evasion, according to one or more embodiments.

FIG. 12 is a diagram of file execution results in the threat analysis system, according to one or more embodiments.

DETAILED DESCRIPTION

Figure 1:
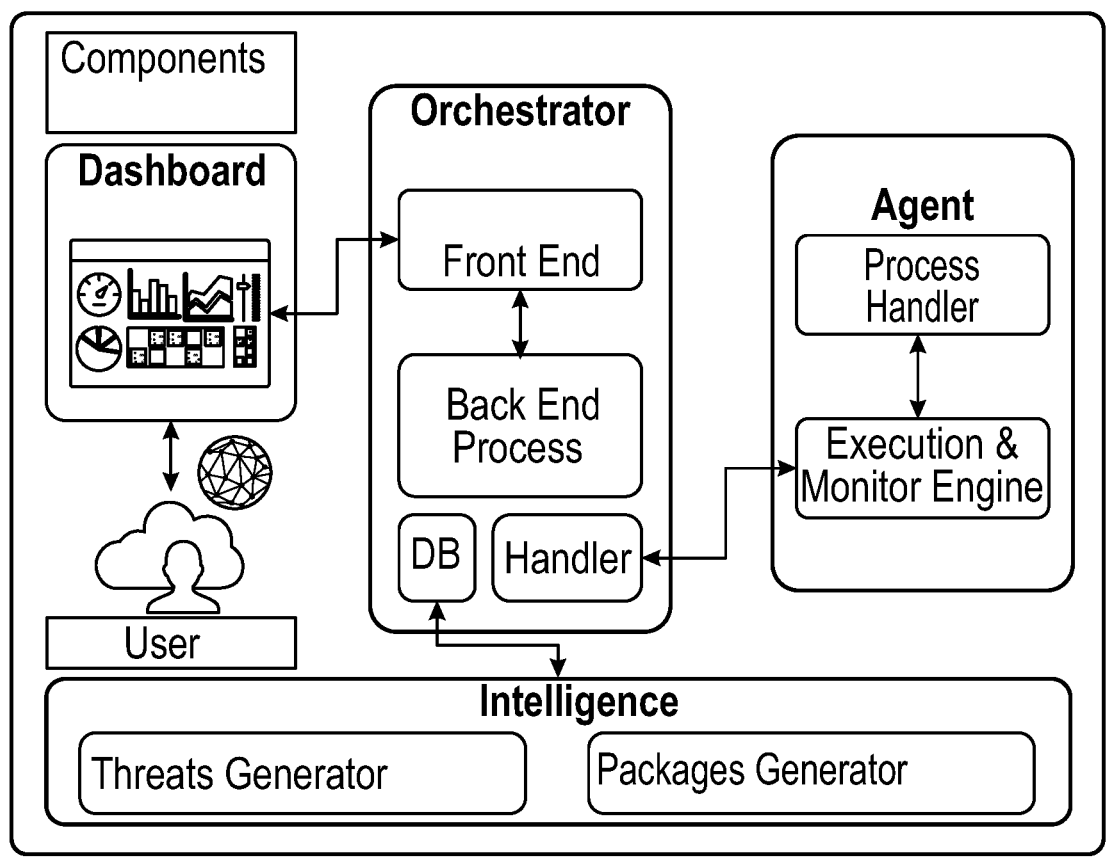
FIG. 1 is a diagram of threat analysis components, including the threat analysis dashboard, the threat analysis orchestrator, the threat analysis agent, and the threat analysis intelligence, according to one or more embodiments.

Persons of ordinary skill in the art will understand that the present disclosure is illustrative only and not in any way limiting. Each of the features and teachings disclosed herein can be utilized separately or in conjunction with other features and teachings to provide a system and method for the Zero-day Attack Prevention Cybersecurity System and Method. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed in the detailed description may not be necessary to practice the teachings in the broadest sense and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulate and transform data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Unless the context requires otherwise, throughout the specification and claims which follow, the word "comprise" and variations thereof, such as "comprises" and "comprising," are to be construed in an open, inclusive sense, that is, as "including, but not limited to." Reference throughout this specification to "one implementation" or "an implementation" means that a particular feature, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise. The headings and Abstract of the Disclosure provided herein are for convenience only and do not interpret the scope or meaning of the implementations.

System Features:

The Zero-day Attack Prevention Cybersecurity System provides the power of assessment to the entire cybersecurity team, from the SOC to the CISO and IR teams. Security may also be quantified and measured according to prevention, detection, and response, like any other metric-based business unit. The Zero-day Attack Prevention Cybersecurity System translates the true effectiveness of solutions into business insights and action points. The Zero-day Attack Prevention Cybersecurity system provides the following technological improvements: Identify cybersecurity gaps to optimize resources; Provide visibility on which tools or controls are more or less valuable; Expose overlapping values of deployed solutions and enable confident decisions to be made to remove obsolete products; Quantitatively measure response times to a possible security breach (is your team improving or getting worse); Increase efficiency by providing certainty of the total value of cybersecurity investments and their effectiveness in the face of real events; Manage cybersecurity through on-demand testing in a real testing environment; Effectiveness based on measurable metrics across the entire flow of cybersecurity solutions; and Continuously validate and improve an organization's defenses against known and unknown attacks.

Figure 2:
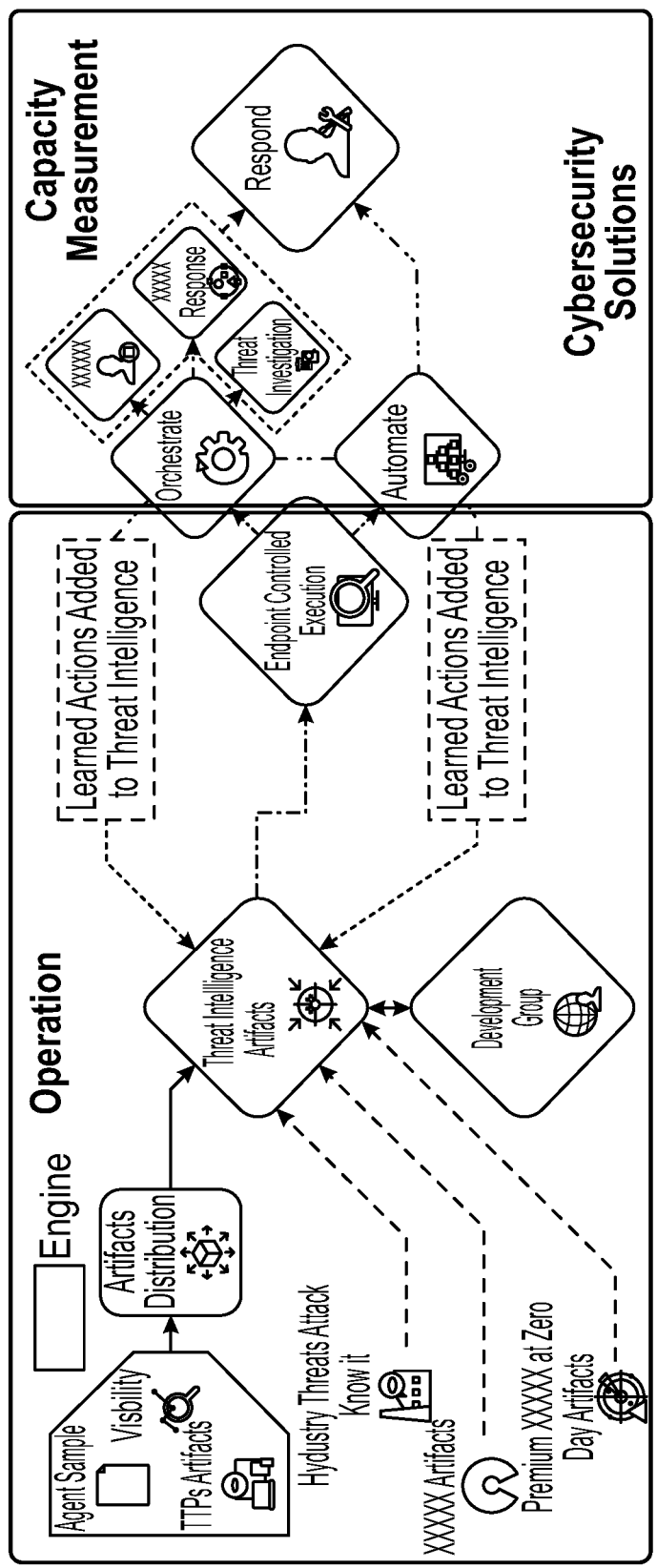
FIG. 2 is a logical flow diagram of a threat analysis operation and capacity measurement, according to one or more embodiments.

FIG. 1 is a diagram of threat analysis components, including the threat analysis dashboard, the threat analysis orchestrator, the threat analysis agent, and the threat analysis intelligence, according to one or more embodiments. FIG. 2 is a logical flow diagram of a threat analysis operation and capacity measurement, according to one or more embodiments.

The Zero-Day Attack Prevention Cybersecurity System Agent:

In some embodiments, a Zero-day Attack Prevention Cybersecurity System agent is installed at an endpoint within the client's network. The endpoint preferably has the organization's gold image (e.g., a defined security baseline, such as encryption standards, requirement of documented software or hardware, recency of patch installation or evaluation, verifying validity of software against the software provider's checksum, or others, against which the endpoint is periodically tested to evaluate whether the endpoint adheres to the security compliance requirements of the organization) with cybersecurity solutions (e.g., malware-detection software, anti-malware software, firewall, or others) that are normally deployed institutionally. For each gold image that the organization has, it is recommended to install a VM (i.e., a virtual machine) and install the Zero-day Attack Prevention Cybersecurity System agent on the VM. An agent may not be installed at each end point. An agent is preferably installed on each VM intended for validation and measurement of an endpoint's security.

The agent is configured to cooperate with a module in the VM or endpoint to control network communication outgoing from the endpoint. The agent is preferably configured to limit such outgoing communication to predefined or selected communications, such as metrics, measurement, validation, or other evaluation information, but not the TTPs or other information. Accordingly, the agent facilitates an end-to-end secure environment from the orchestrator or dashboard (described below) to the agent and back, thereby facilitating validation and measurement of the endpoint's security using malicious code but without risk of the malicious code escaping through the network to other endpoints that are communicatively coupled to the endpoint being evaluated (i.e., the endpoint at which the agent is installed).

The Zero-Day Attack Prevention Cybersecurity System Orchestrator:

In some embodiments, a Zero-day Attack Prevention Cybersecurity System orchestrator validates that the agent has been successfully installed and allows standardized TTPs and some zero-day or non-standard TTPs to be sent across the network, executing defined artifacts on-demand. It is the set of front-end and back-end services.

Figure 3:
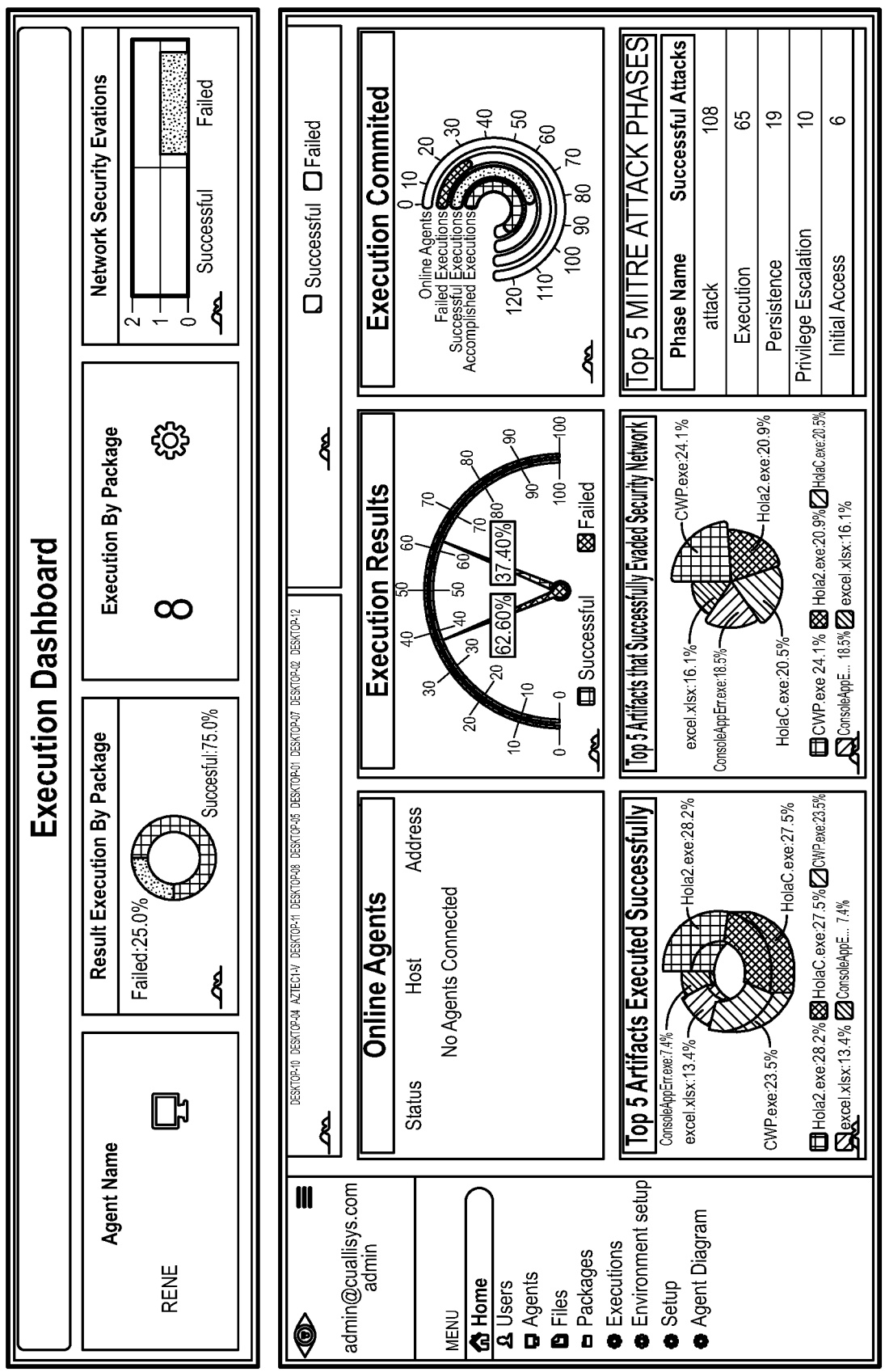
FIG. 3 is a diagram of an advanced executive dashboard and threat granularity, according to one or more embodiments.

FIG. 3 is a diagram of an advanced executive dashboard and threat granularity, accordingly to one or more embodiments.

The Zero-Day Attack Prevention Cybersecurity System Advanced Dashboard:

In some embodiments, a Zero-day Attack Prevention Cybersecurity System dashboard shows execution results and allows control of future tests that will be executed at the endpoint. It also shows graphs that demonstrate the effectiveness of deployed solutions. The dashboard presents results of the executions and provides visibility in the results obtained.

The Zero-Day Attack Prevention Cybersecurity System Granularity:

In some embodiments, the Zero-day Attack Prevention Cybersecurity System has granularity for on-demand execution. Each package has scripts with real samples of advanced threats. One execution consists of packages, and an agent can have N number of executions. Therefore, each available package represents different behaviors of the different cyber actors, in this way it is possible to cover different stages and phases of attack using the content of the different packages.

FIG. 4 is diagram of listed packages and package parameters, according to one or more embodiments.

Figure 5:
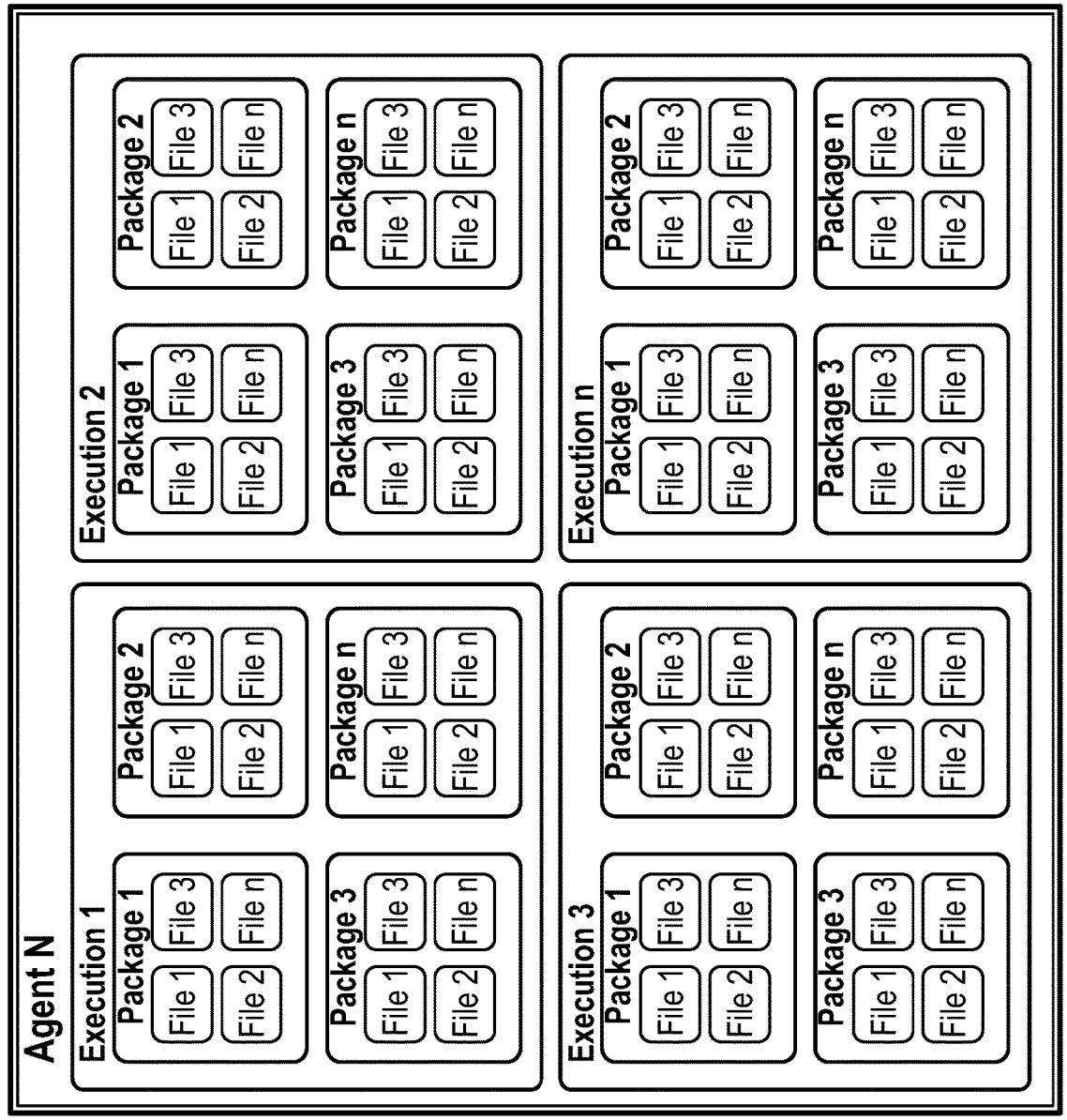
FIG. 5 is a schematic diagram of files, package groups, execution groups, and agent groups, according to one or more embodiments.

FIG. 5 is a schematic diagram of files, package groups, execution groups, and agent groups, according to one or more embodiments.

The Zero-day Attack Prevention Cybersecurity System Network Architecture:

At the network architecture level, the Zero-day Attack Prevention Cybersecurity System is installed as an AWS instance on the cloud and is given access to an agent within the organization that holds all security controls, the golden image.

Figure 6A:
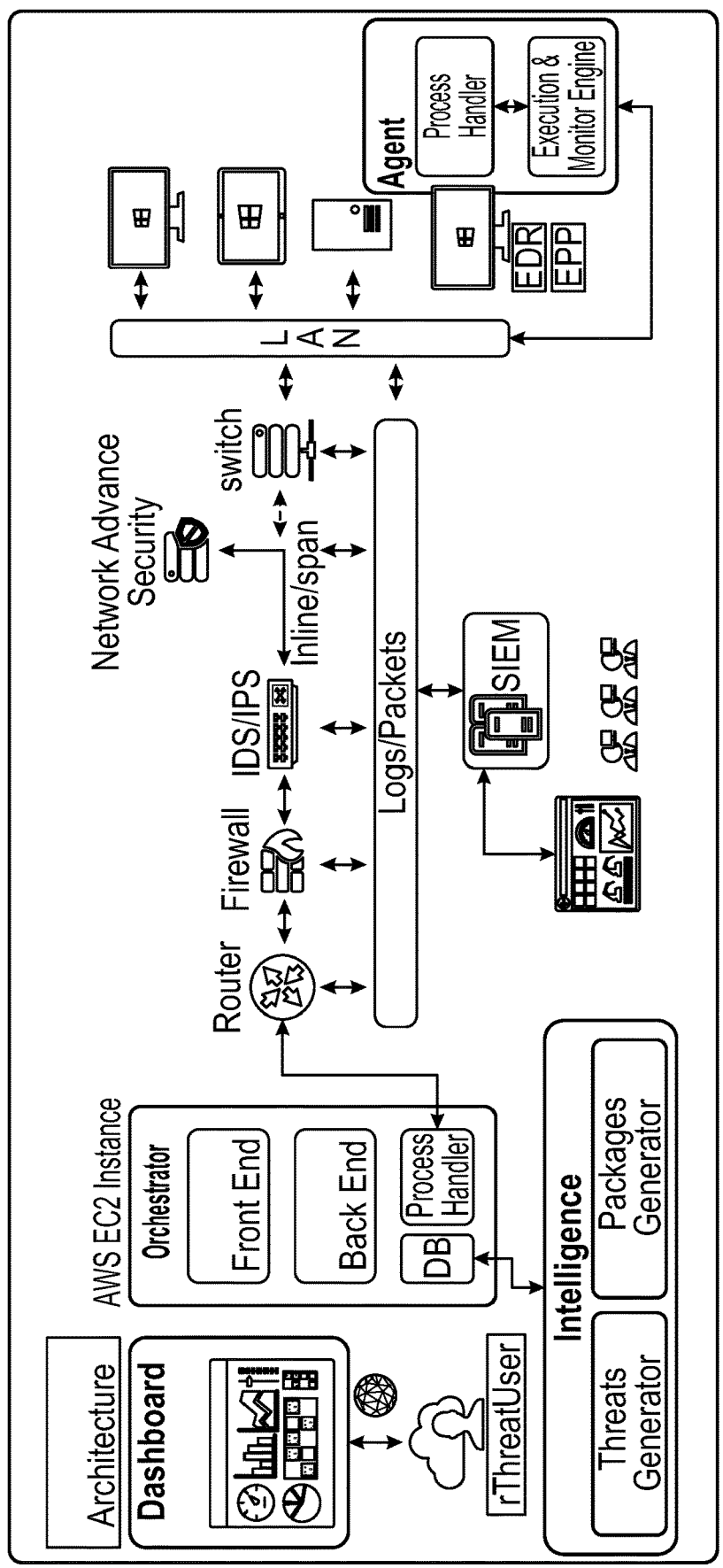
FIG. 6A is a diagram of the threat analysis network architecture, according to one or more embodiments.

FIG. 6A illustrates the flow that artifacts follow once shipped in a mature cybersecurity environment. FIG. 6A is a diagram of the threat analysis network architecture, according to one or more embodiments. In some embodiments, the Zero-day Attack Prevention Cybersecurity System provides custom-made artifacts contained in packages, which are sent over the network and run on the VM with the client's gold image, the agent applies control mechanisms and sends the response to the orchestrator with the results obtained.

The Zero-day Attack Prevention Cybersecurity System Callback Monitoring and Validation:

In some embodiments, the Zero-day Attack Prevention Cybersecurity System creates and makes available to its users, custom callback artifacts, said callback can be a kill switch or malware download, the callback is monitored by the Zero-day Attack Prevention Cybersecurity System and the Orchestrator validates and determines if the callback arrived successfully or not.

This functionality enables the system to validate mandatory playbooks that exist in the Security Orchestrator, one of these mandatory playbooks is the aggregation of URLs that represent these callbacks in an automated way, when a trigger is found. The Zero-day Attack Prevention Cybersecurity System validates the correct execution of the playbooks oriented to the elimination of callbacks, since the package can be sent twice, it is a URL that will not be known during the first execution. If the callback will be successful, the device will alert the EDR or SIEM and the URL should be added in the network security devices by the Orchestrator. In the second execution of the same package, the callback should be failed. If it is, it means that the playbook worked, otherwise, configurations and revisions should be considered.

Figure 6B:
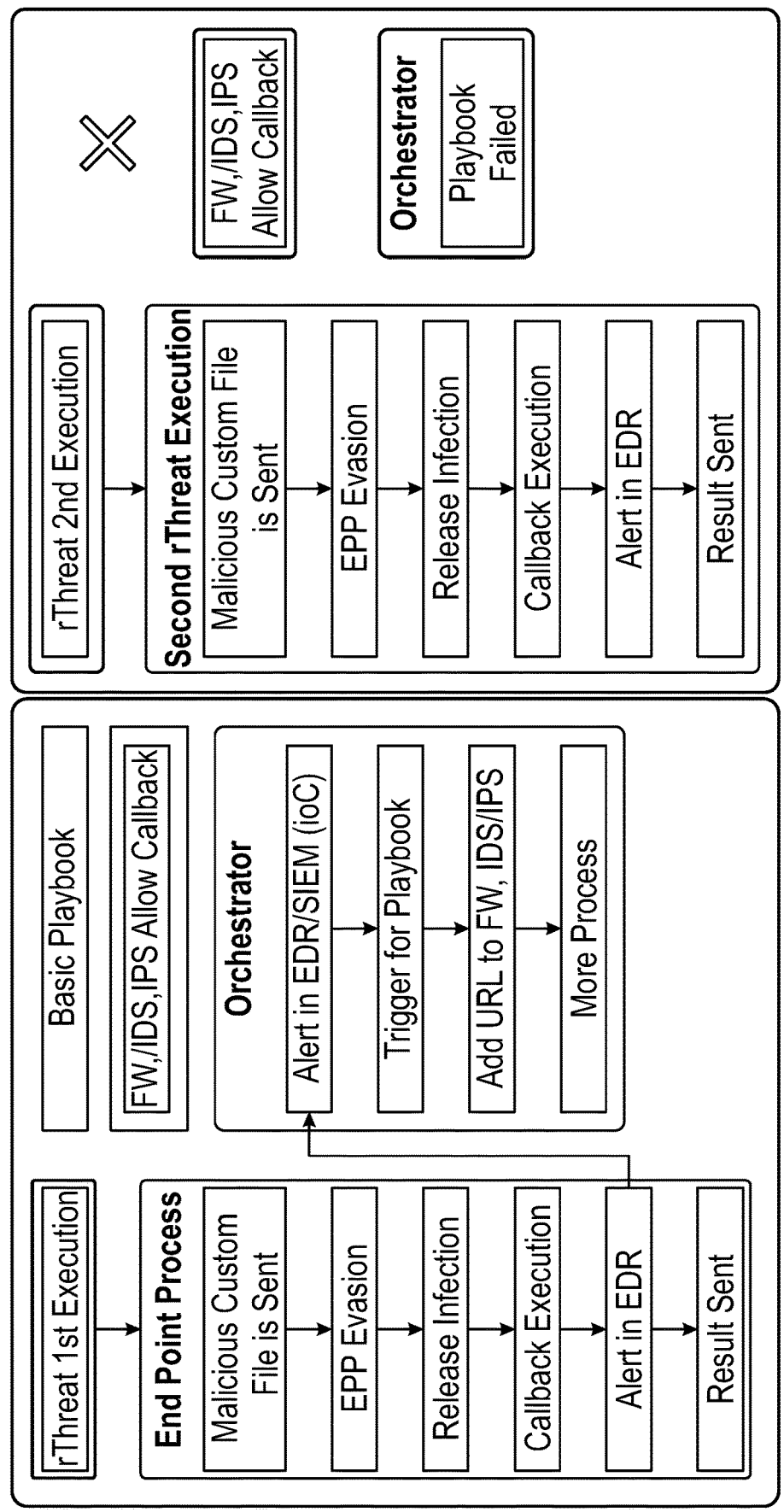
FIGS. 6B and 6C are diagrams showing the evaluation of Security Orchestrator's playbook in response to a first execution and a second execution.
Figure 6B:
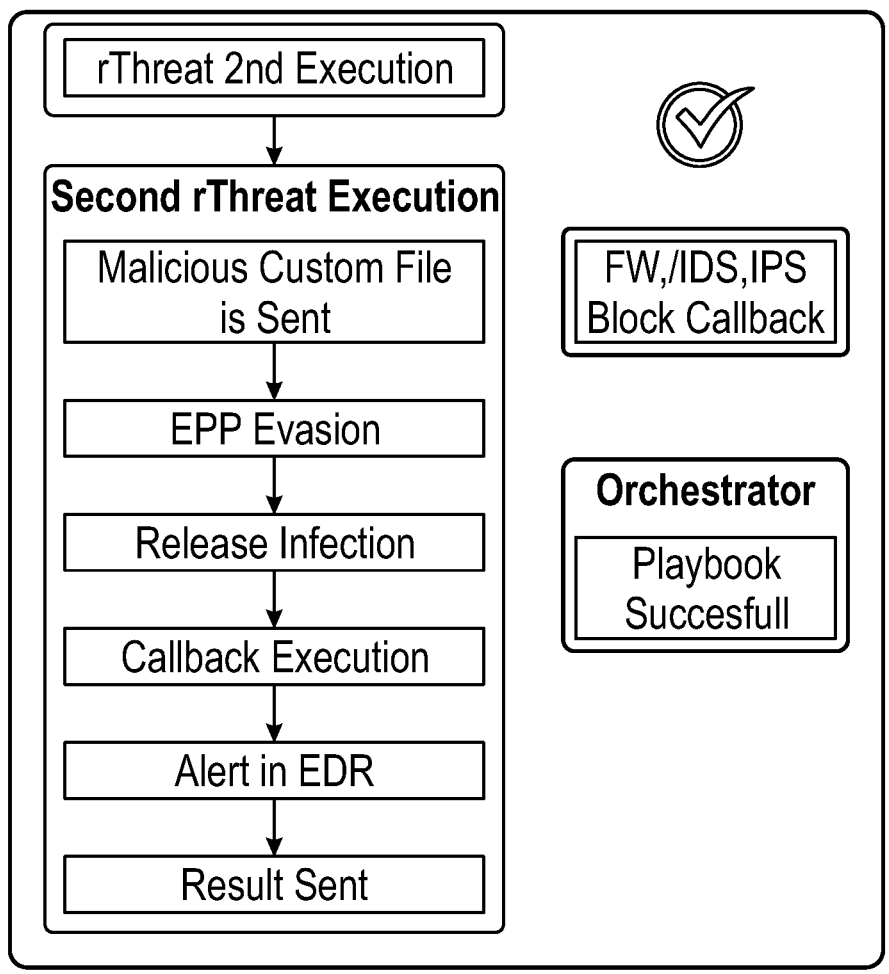
Figure 6C:
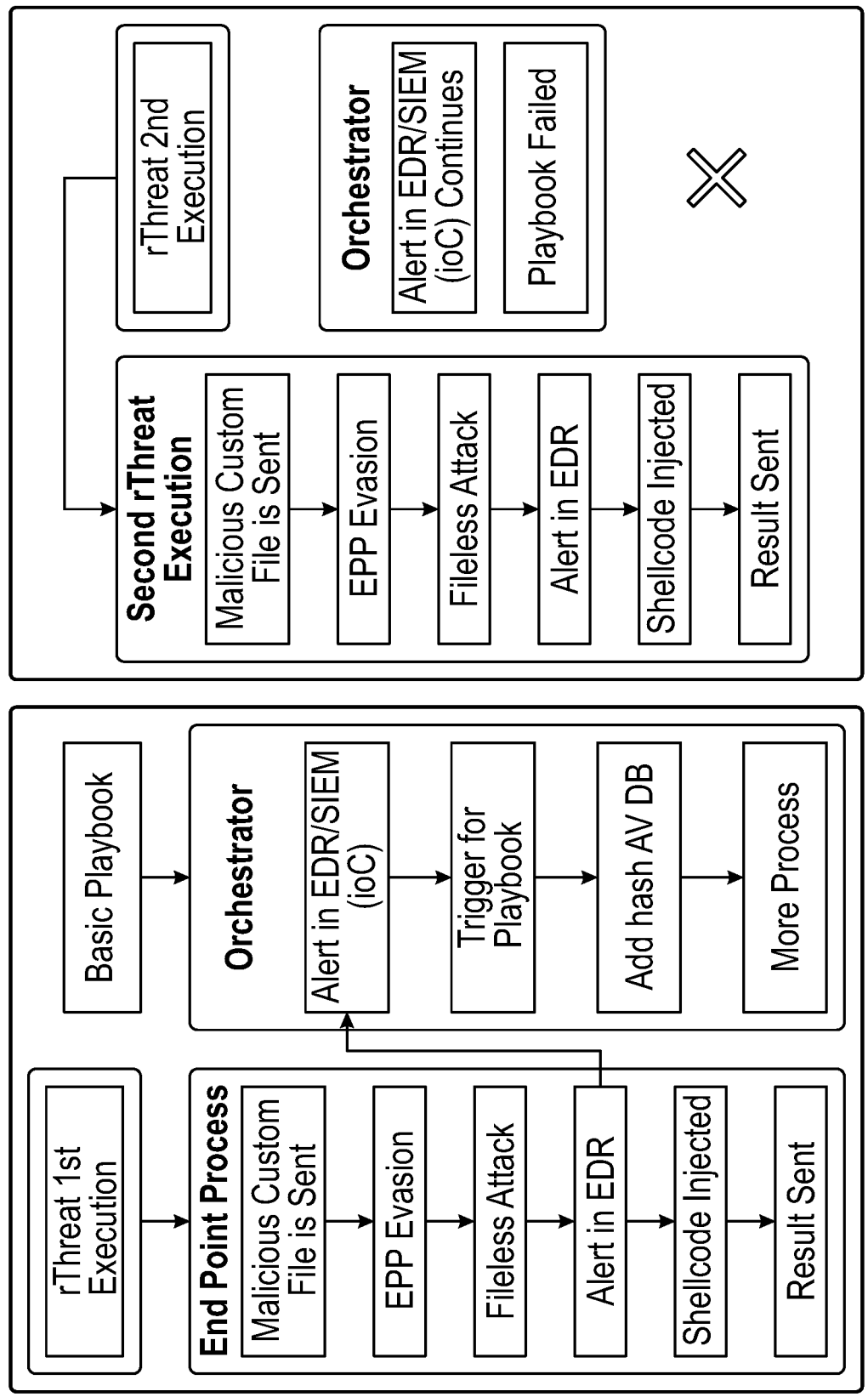
Figure 6C:
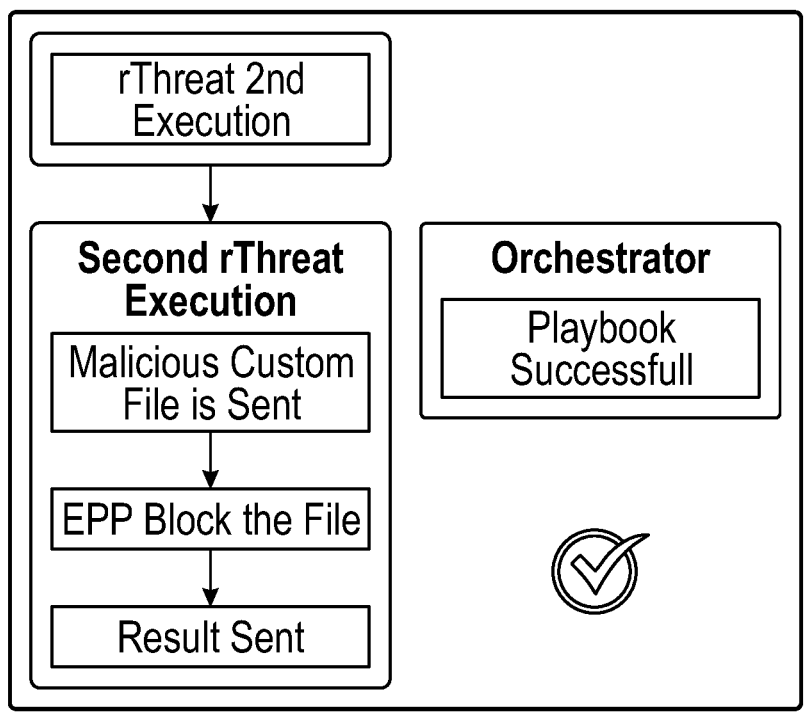

FIGS. 6B and 6C are diagrams showing the evaluation of Security Orchestrator's playbook in response to a first execution and a second execution. The Zero-day Attack Prevention Cybersecurity System has the ability to monitor the callback of the artifacts that the system creates, in such a way that the playbooks of orchestration systems may be validated. This automatically adds the URL that represents the callback in the security devices corresponding to the network when its respective trigger is detected.

Due to the custom artifact creation capabilities of the Zero-day Attack Prevention Cybersecurity System, it is possible for the system to create custom obfuscated artifacts with exact Indicators of Compromise (IoC) trigger capabilities according to the requirements of the playbook. In this manner, if the playbook, has as trigger an IoC corresponding to a fileless attack for example, the Zero-day Attack Prevention Cybersecurity System can generate an exact artifact with that IoC or the set of IoC that the playbook needs.

The Zero-day Attack Prevention Cybersecurity System Advance Network Cyber Security Evasion:

In some embodiments, the Zero-day Attack Prevention Cybersecurity System has the functionality of forcing the evasion of cybersecurity network elements based on sandboxing and hashes, through a shipping and control algorithm based on asymmetric encryption. In this way, it forces the system to verify the correct operation of the solutions of advanced security that promise to verify and validate each artifact that travels the network even when it has advanced obfuscation and encryption mechanisms.

FIG. 7 is a diagram of the threat analysis advanced network cyber security evasion, according to one or more embodiments.

Figure 8:
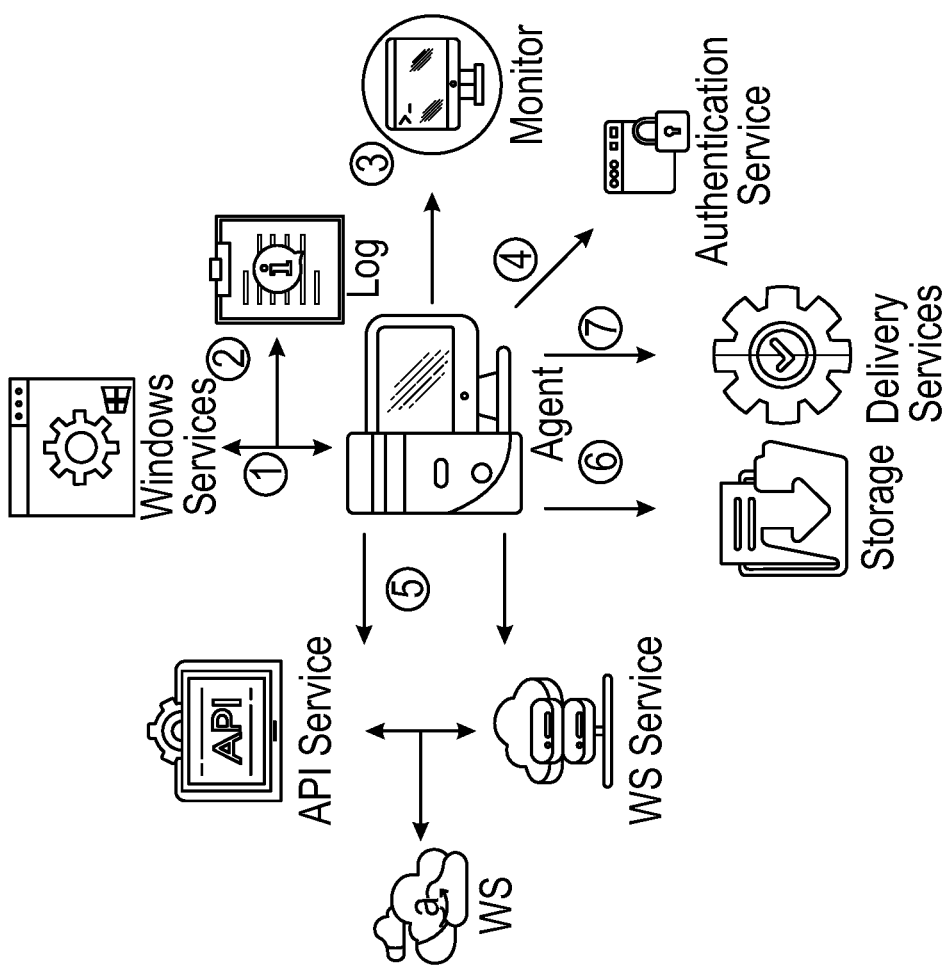
FIG. 8 is a diagram of the threat analysis basic agent operation, according to one or more embodiments.

FIG. 8 is a diagram of the threat analysis basic agent operation, according to one or more embodiments.

The Zero-day Attack Prevention Cybersecurity System Artifacts:

The Zero-day Attack Prevention Cybersecurity System utilizes three types of artifacts: Regular Malware, Custom Artifacts, and Zero Day Artifacts.

Regarding the Regular Malware, the system employs the type of malware that is being used in current cyberattacks and makes them available to users of the system. If this regular malware has current or dangerous lateral moves, these lateral functions are eliminated at the source code level to prevent its spread. Regarding the Custom Artifact, the system employs programs created from scratch with an .exe or .bat or .docx extension. These programs embed an entire attack methodology, from execution and privilege escalation to pilfering. These programs use the same or similar methodologies used by Advanced Persistent Threats (APTs). Regarding the Zero Day Artifacts, the system employs programs created with malicious methodologies and a specific objective. In one or more embodiments, the final artifact is not known, therefore, the hash and the URLs destined for callbacks are unknown. With these artifacts in use, cybersecurity solutions are forced to carry out intelligent validations in order to detect and contain these artifacts. Additionally, evasion and detection methodologies are applied, such as advanced obfuscation and header modification to really challenge cyber security solutions.

Figure 9:
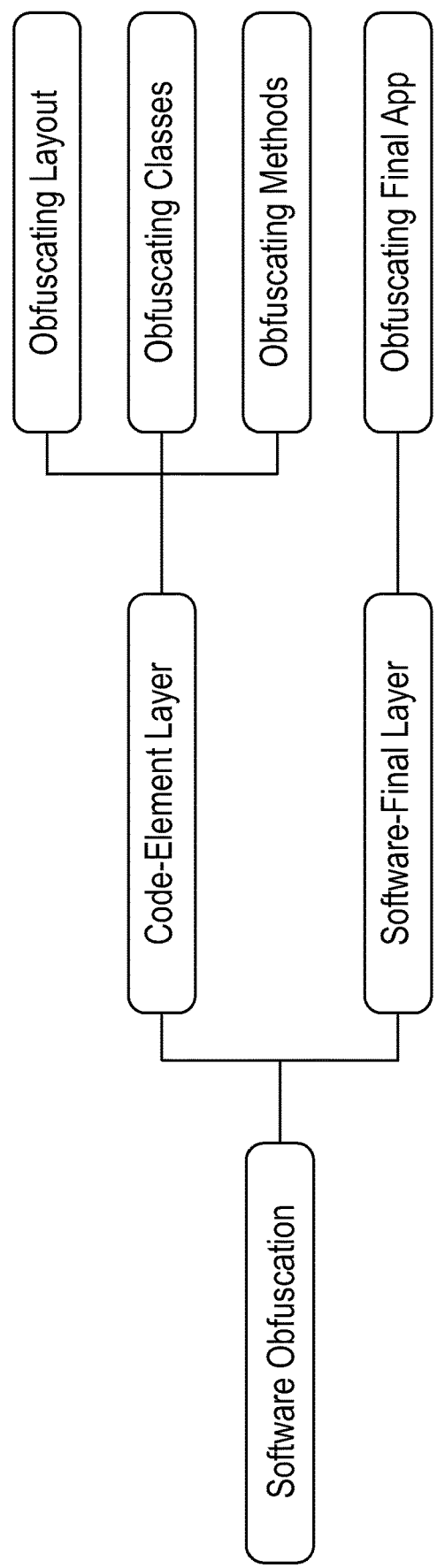
FIG. 9 is a diagram of the threat analysis advanced network evader, according to one or more embodiments.

Referring now to FIG. 9, several types of obfuscation methodologies are shown that are utilized in the Zero-day Attack Prevention Cybersecurity System. For example, in some embodiments, code-element layers or software obfuscation may be used, such as obfuscating layout, obfuscating classes, or obfuscating methods. In other embodiment, software-final layer obfuscation may be used, such as obfuscating final applications.

As part of network evasion techniques, as well as evasion of fileless attack detection methodologies, encryption is applied in the opcodes that describe a shellcode. The Zero-day Attack Prevention Cybersecurity System applies different levels of encryption in opcodes for the injection of shellcodes. This technique is reused in the artifacts that the system creates.

Figure 10:
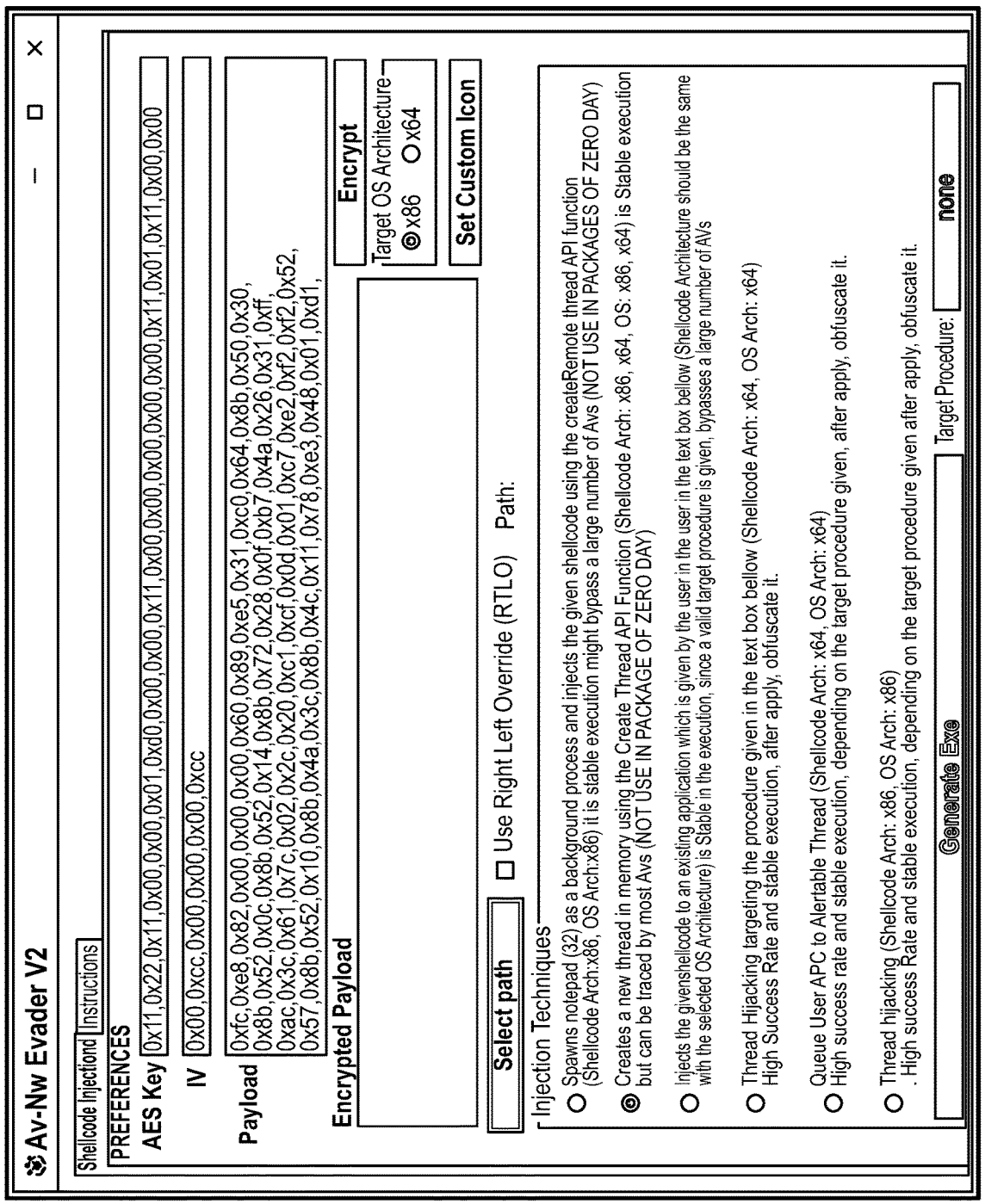
FIG. 10 is a diagram of the threat analysis advanced network cyber security evasion, according to one or more embodiments.

FIG. 10 is a diagram of the threat analysis advanced network cyber security evasion, according to one or more embodiments.

In some embodiments of the Zero-day Attack Prevention Cybersecurity System, the packet is sent over the network, and the agent verifies if the packet arrived successfully. If the packet arrived successfully, this means that there are vulnerabilities, lack of configurations, or lack of context in the devices destined for network security. Once the agent receives the package, it validates the integrity of the files (artifacts) that make up this package. The package is validated if the network security evasion mechanism was activated. The package also is validated if the custom callback functionality was activated. According to these verifications, different actions are applied before continuing with the process. Afterwards, the agent executes the malicious artifacts using multithread processes. The execution result is reviewed and sent in parallel to the Orchestrator.

Figure 11A:
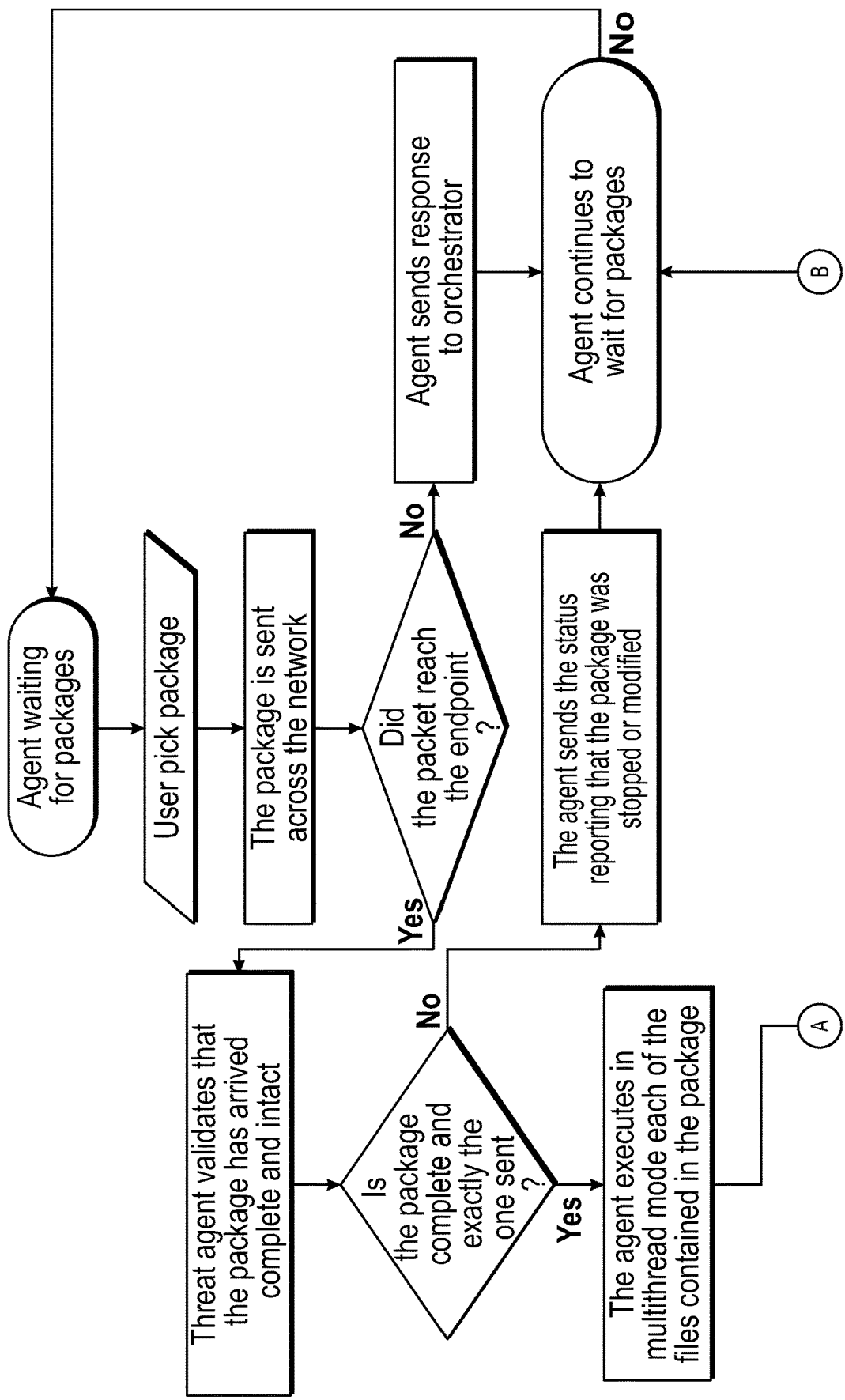
FIGS. 11A, 11B, and 11C are a logic diagram of the package moving through the threat analysis system, according to one or more embodiments.
Figure 11B:
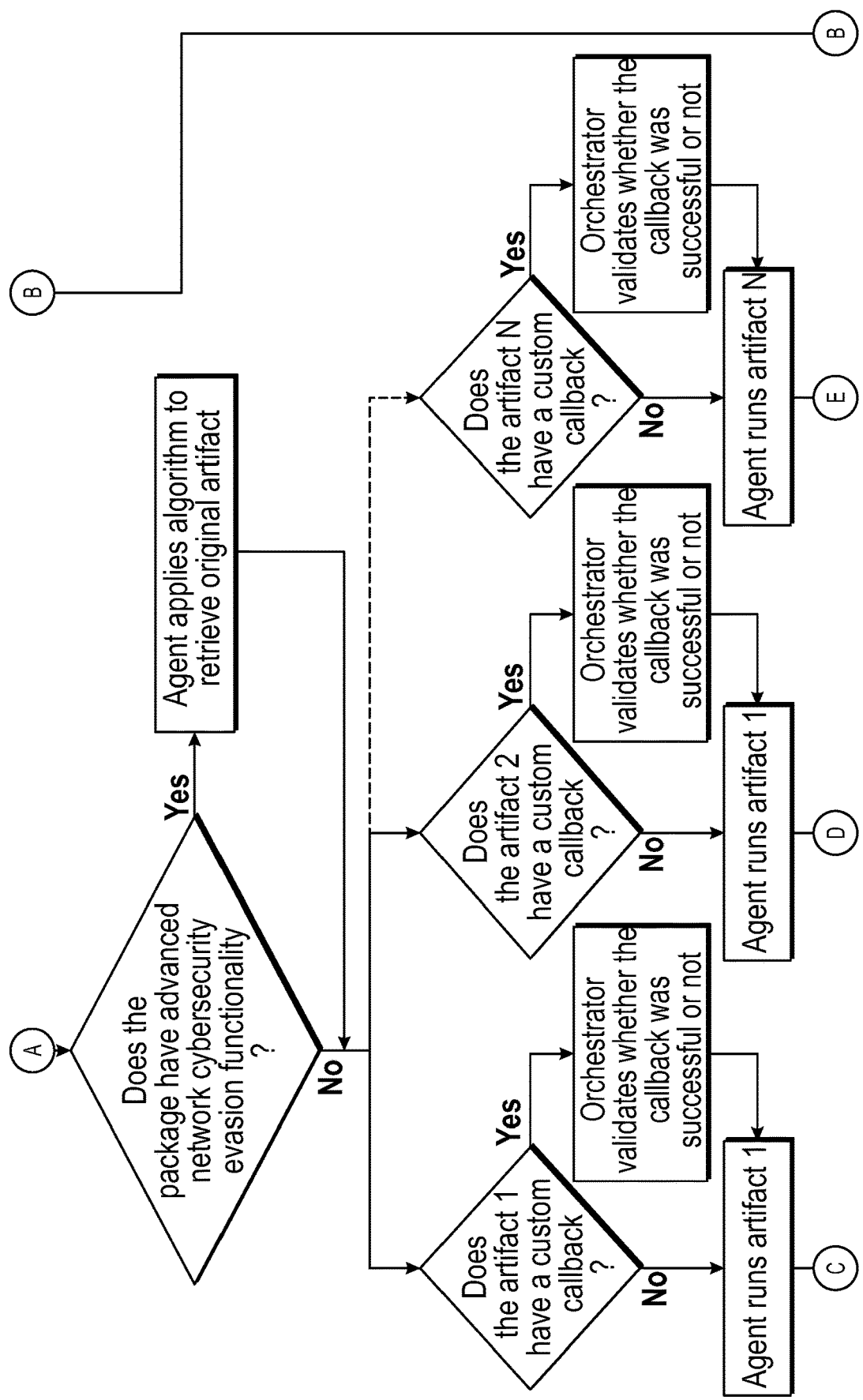
Figure 11C:
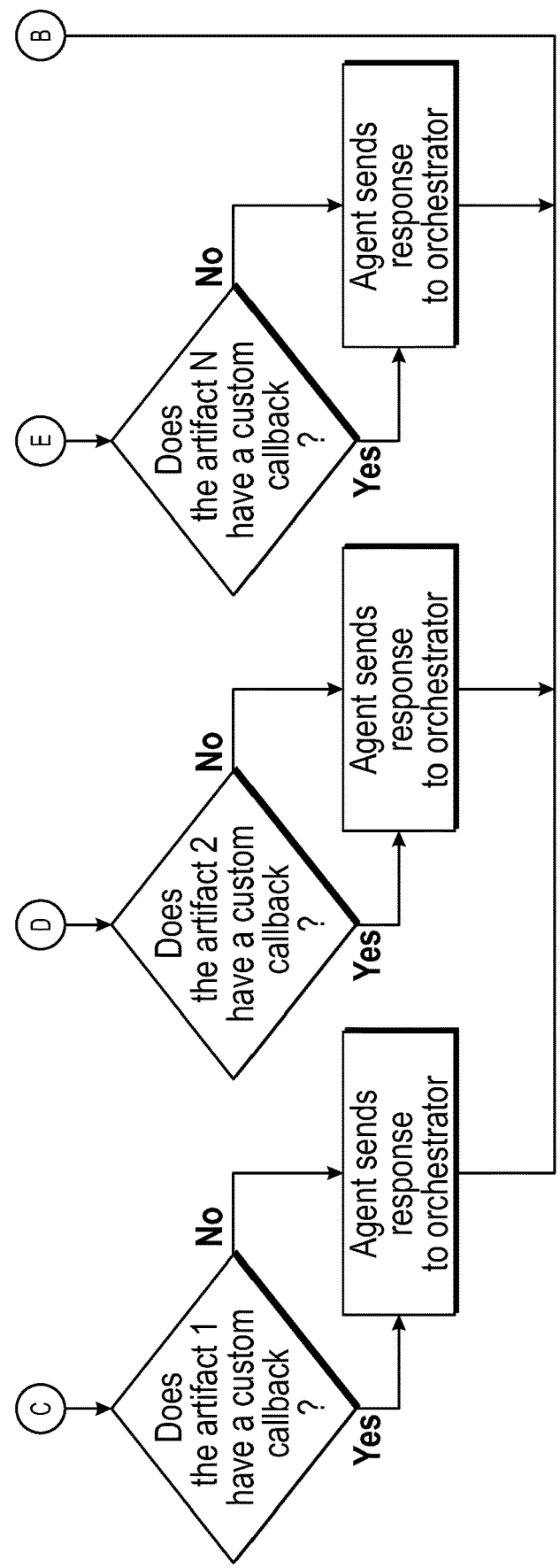

FIGS. 11A, 11B, and 11C are a logic diagram of the package moving through the threat analysis system, according to one or more embodiments.

The Zero-day Attack Prevention Cybersecurity System Results of Execution:

In the Zero-day Attack Prevention Cybersecurity System, the packets representing TTPs have standardized artifacts in the MITER framework. MITER is a globally accessible knowledge base of adversary tactics and techniques based on real-world observations of cyberattacks. Therefore, the results are placed under this standard and allow greater visibility of the attack sent.

Also, in this view, it is possible to validate if the artifact evaded network security, and if its execution was successful at the endpoint. This is precisely what enables our users to have full visibility of what happened and which security controls were successful and which were not.

Figure 11D:
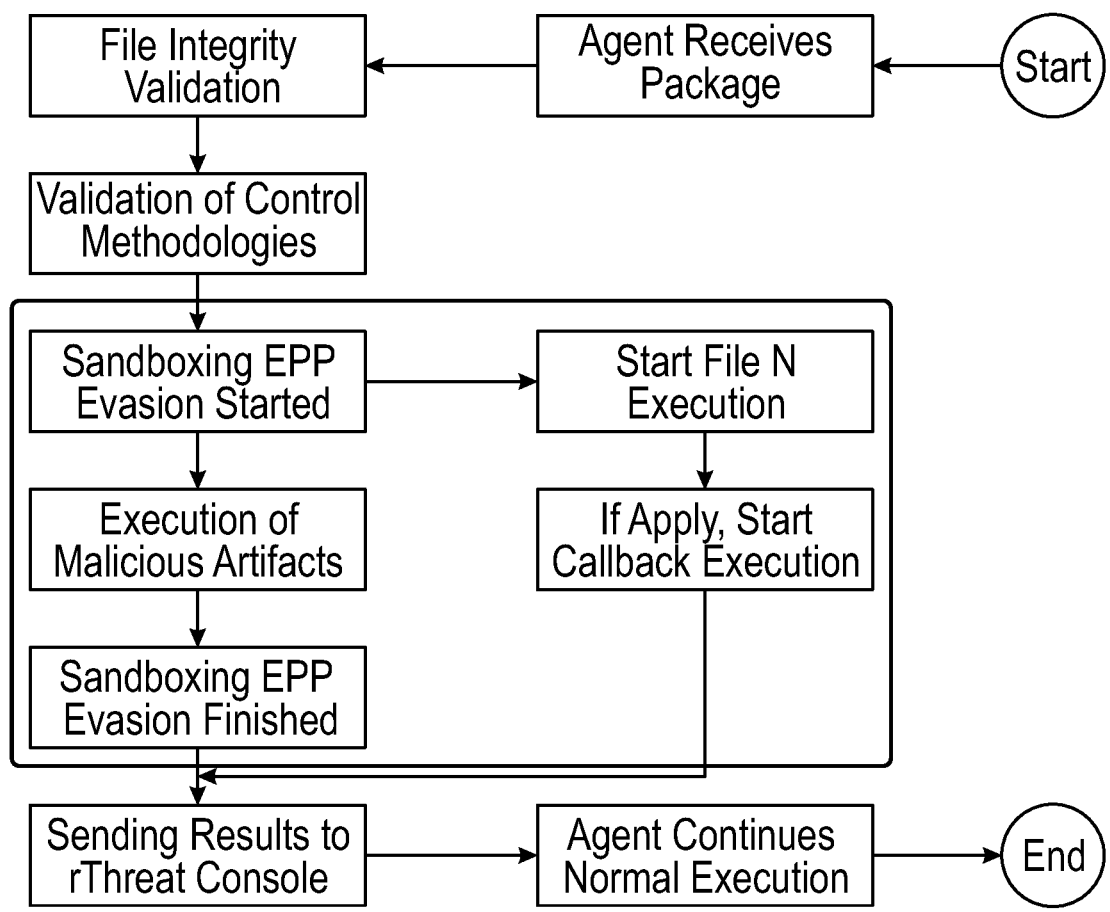
FIG. 11D is a logic diagram showing Agent Endpoint Protection Platform (EPP) Sandboxing Evasion.

FIG. 11D is a logic diagram showing Agent Endpoint Protection Platform (EPP) Sandboxing Evasion. Some EPP's have the ability to send the suspicious sample to a sandbox in the cloud. This technology can be from different vendors. As soon as they find a suspicious indicator, they will send a response to the EPP marking the sample as malicious, which will result in the file being blocked. Using a previously worked artifact without trying to evade this analysis does not reflect a real attack methodology. A real attacker will try to avoid this external detection in multiple ways. The threat agent has evasion of sandboxing in the cloud, which follows the flow shown in FIG. 11D. The evasion of the EPP in the cloud is to prevent the antivirus from sending the suspicious sample to the cloud for analysis, thus the EPP is obliged to actually detect possible indicators of behavior and compromise by itself and not supported by third parties.

Figure 11E:
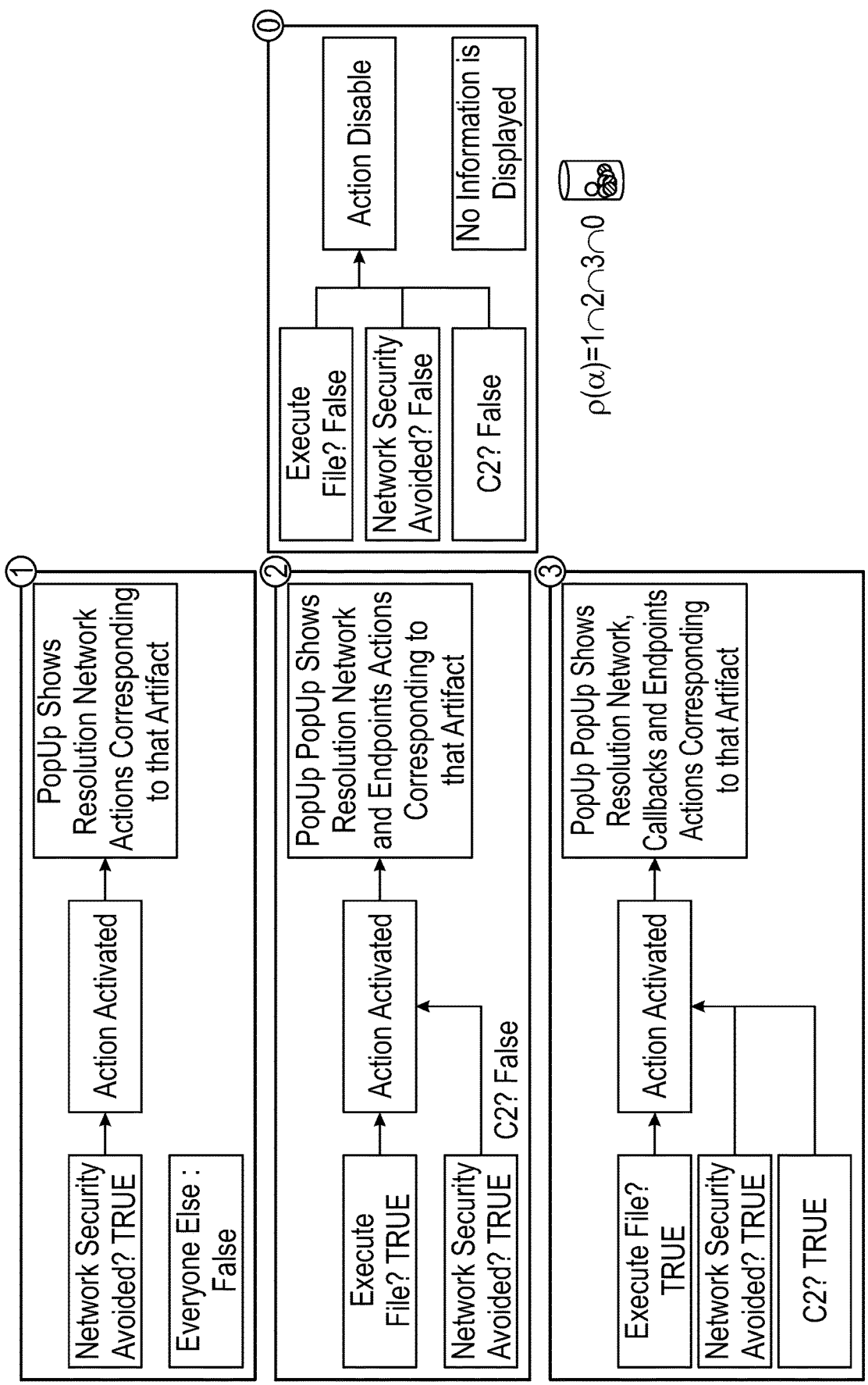
FIG. 11E is a logic diagram of the threat analysis system showing Logic in Actions: Execution and Recommendations.

FIG. 11E is a logic diagram of the threat analysis system showing Logic in Actions: Execution and Recommendations. The system is capable of displaying resolution recommendations for three validated vectors including: resolution network actions, resolution endpoint actions, and resolution callback actions. FIG. 11E displays the threat operation logic based on resolution of malicious files or artifacts.

Figure 13:
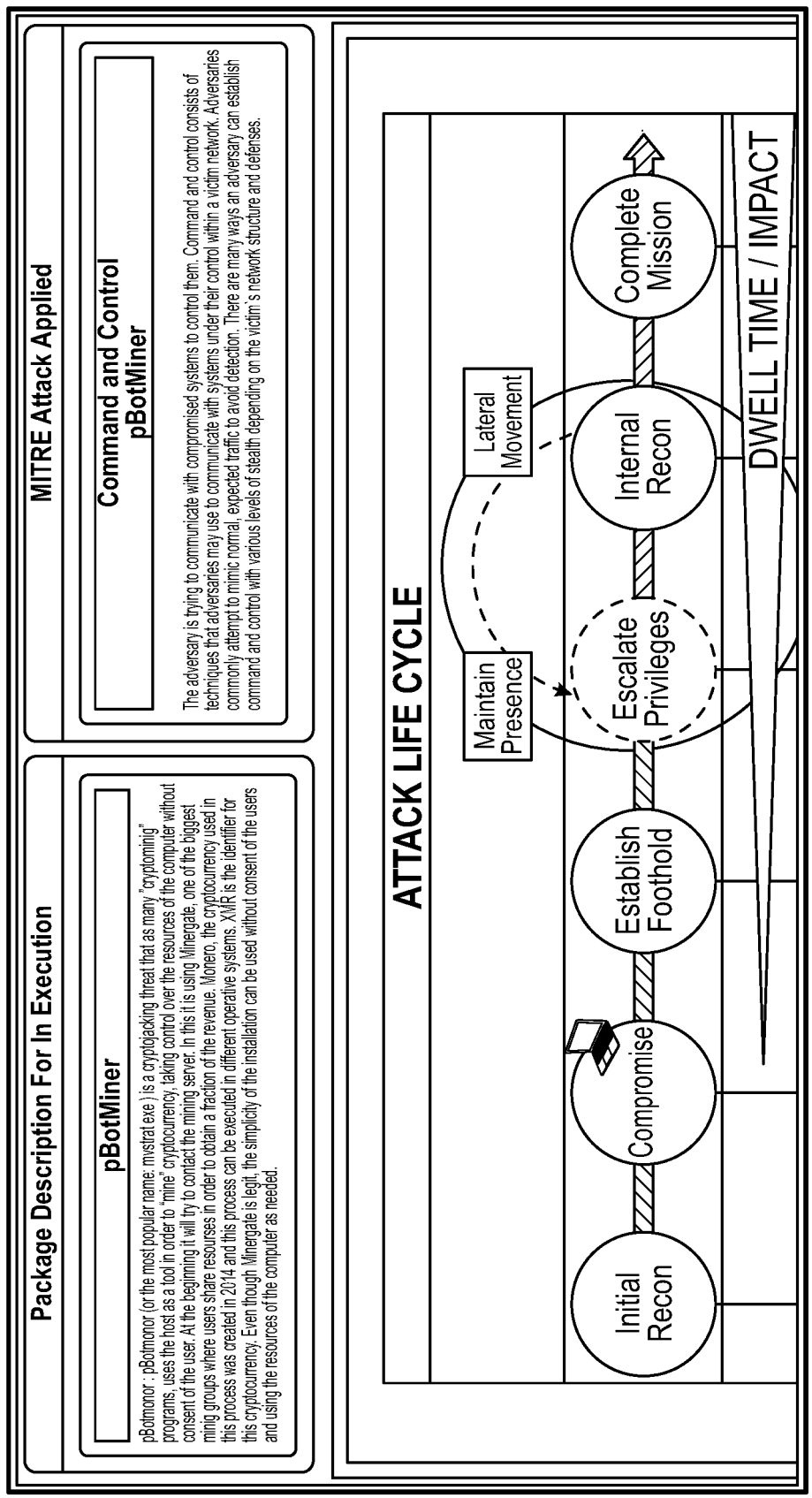
FIG. 13 is a diagram of an attack life cycle with dwell time and impact, according to one or more embodiments.
Figure 14:
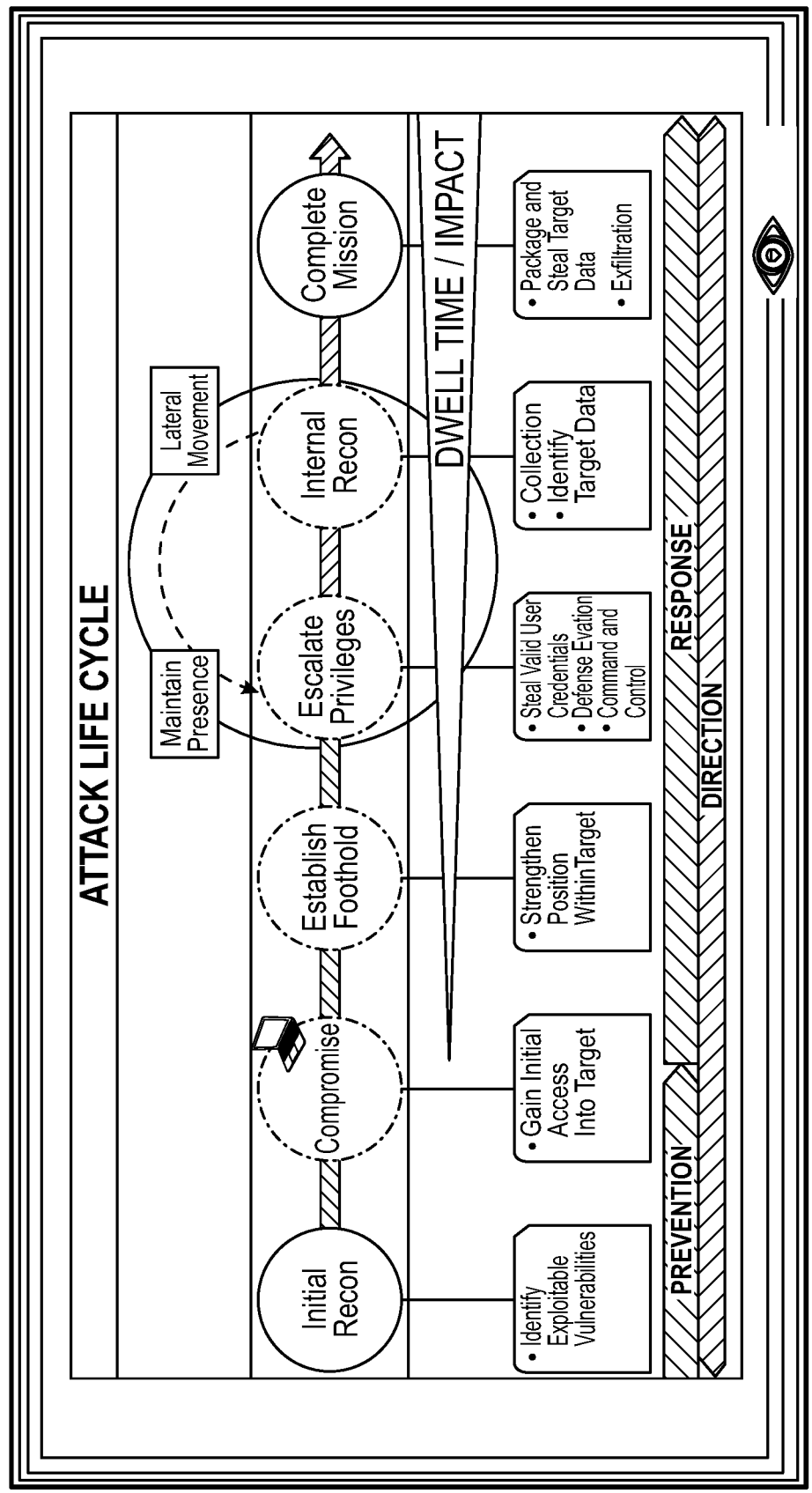
FIG. 14 is a diagram of an attack life cycle with dwell time and impact as well as prevention and response, according to one or more embodiments.

FIG. 12 is a diagram of file execution results in the threat analysis system, according to one or more embodiments. Each package as well as each artifact contained in the package is aligned to the MITRE framework, as well as a dynamic graph that shows in which phase within the roadmap of an attack it was reported or activated FIG. 13 is a diagram of an Attack Life Cycle with Dwell Time and Impact, according to one or more embodiments. FIG. 14 is a diagram of an Attack Life Cycle with Dwell Time and Impact as well as prevention and response, according to one or more embodiments. Compared to FIG. 13, FIG. 14 shows how the Zero-day Attack Prevention Cybersecurity System is used to prevent the following attack actions: identify exploitable vulnerabilities, gain initial access into the target, strengthen position within the target, steal valid user credentials, defense evasion, command and control, collection and identify target data, package and steal target data, and exfiltration.

Figure 15:
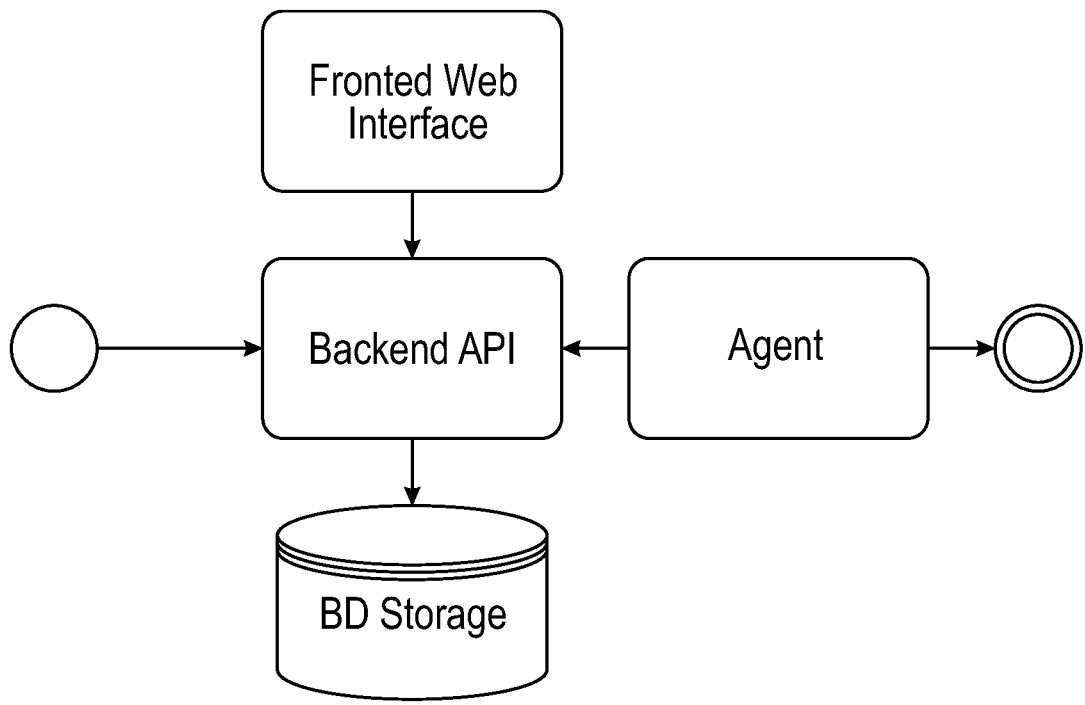
FIG. 15 is a diagram of threat analysis deep architecture, according to one or more embodiments.

The Zero-day Attack Prevention Cybersecurity System Deep Architecture:

Referring now to FIG. 15, this is the general architecture of the Orchestrator seen by blocks. FIG. 15 is a diagram of threat analysis deep architecture, according to one or more embodiments. In some embodiments of the Zero-day Attack Prevention Cybersecurity System, the design of the application is designed in a multi-level architecture, that is, different components are separated and can be used in different projects, which gives our application great versatility. In one or more embodiments, the architecture of the system is mainly divided into client-server, keeping in mind that on the client side it is projected that it can be executed and designed for any platform, whether using any language such as java or .net or any other technology, with the objective that it may be cross-platform in the medium or short or term.

Figure 16:
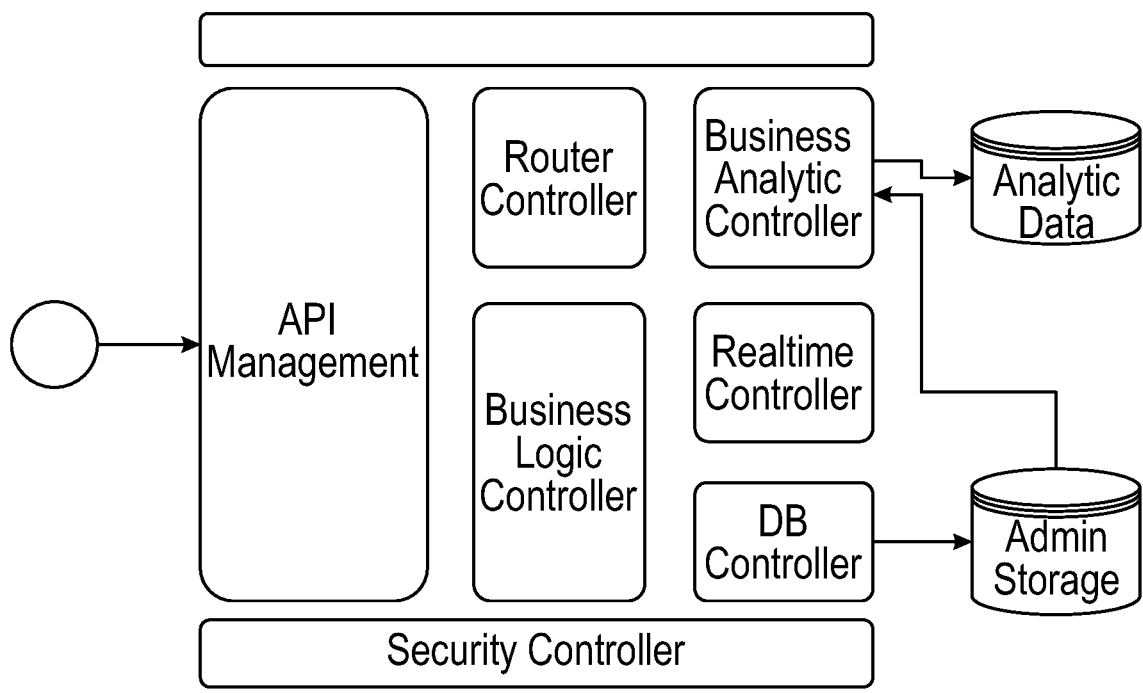
FIG. 16 is a diagram of back end API by block in the threat analysis system, according to one or more embodiments.
Figure 17:
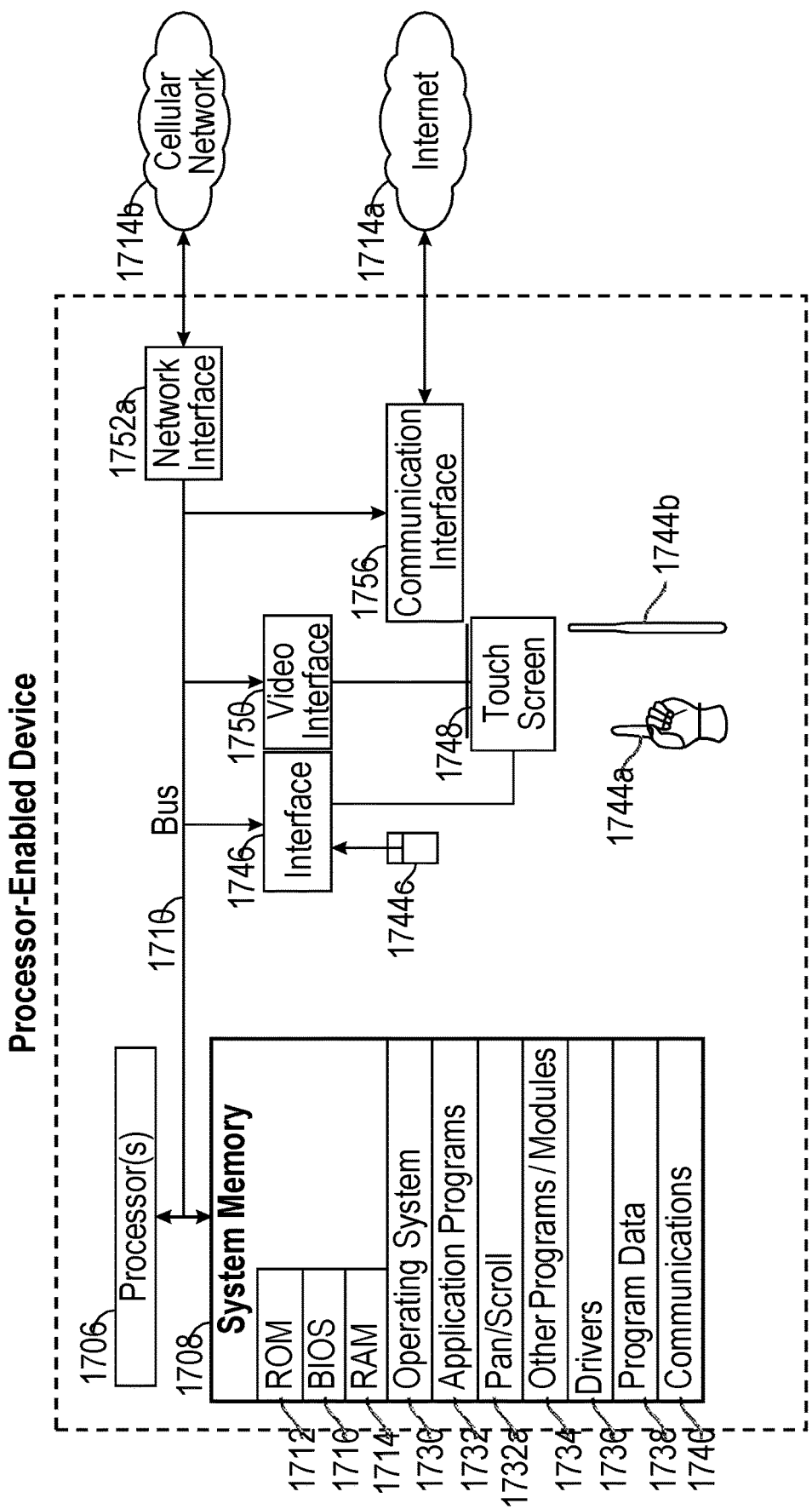
FIG. 17 is a block diagram of an example processor-based device used to implement one or more of the electronic devices described in the threat analysis system, according to one or more embodiments.

FIG. 16 is a diagram of Back End API by block in the threat analysis system, according to one or more embodiments. Referring now to FIG. 17, FIG. 17 is a block diagram of an example processor-based device used to implement one or more of the electronic devices described in the threat analysis system, according to one or more embodiments.

For use in conjunction with the Zero-day Attack Prevention Cybersecurity System and method 100, FIG. 17 shows a processor-based device suitable for implementing computing infrastructure for the suppliers/merchants 120 and the developer/consumer 140, as well as the processor-based desktop and mobile devices that support the applications created by the developer for end user purchasers. Although not required, some portion of the implementations will be described in the general context of processor-executable instructions or logic, such as program application modules, objects, or macros being executed by one or more processors. Those skilled in the relevant art will appreciate that the described implementations, as well as other implementations, can be practiced with various processor-based system configurations, including handheld devices, such as smartphones and tablet computers, wearable devices, multiprocessor systems, microprocessor-based or programmable consumer electronics, personal computers ("PCs"), network PCs, minicomputers, mainframe computers, and the like.

In the Zero-day Attack Prevention Cybersecurity System and method 100, the processor-based device may, for example, take the form of a smartphone or wearable smart glasses, which includes one or more processors 1706, a system memory 1708 and a system bus 1710 that couples various system components including the system memory 1708 to the processor(s) 1706. The processor-based device will, at times, be referred to in the singular herein, but this is not intended to limit the implementations to a single system, since in certain implementations, there will be more than one system or other networked computing devices involved. Non-limiting examples of commercially available systems include, but are not limited to, ARM processors from a variety of manufactures, Core microprocessors from Intel Corporation, U.S.A., PowerPC microprocessor from IBM, Sparc microprocessors from Sun Microsystems, Inc., PA-RISC series microprocessors from Hewlett-Packard Company, and 68xxx series microprocessors from Motorola Corporation.

The processor(s) 1706 in the processor-based devices of the Zero-day Attack Prevention Cybersecurity System and method 100 may be any logic processing unit, such as one or more central processing units (CPUs), microprocessors, digital signal processors (DSPs), application-specific integrated circuits (ASICs), field programmable gate arrays (FPGAs), and the like. Unless described otherwise, the construction and operation of the various blocks shown in FIG. 17 are of conventional design. As a result, such blocks need not be described in further detail herein, as they will be understood by those skilled in the relevant art.

The system bus 1710 in the processor-based devices of the Zero-day Attack Prevention Cybersecurity system and method 100 can employ any known bus structures or architectures, including a memory bus with memory controller, a peripheral bus, and a local bus. The system memory 1708 includes read-only memory ("ROM") 1712 and random-access memory ("RAM") 1714. A basic input/output system ("BIOS") 1716, which can form part of the ROM 1712, contains basic routines that help transfer information between elements within processor-based devices, such as during start-up. Some implementations may employ separate buses for data, instructions, and power.

The processor-based device of the Zero-day Attack Prevention Cybersecurity System and method 100 may also include one or more solid state memories; for instance, a Flash memory or solid state drive (SSD), which provides nonvolatile storage of computer-readable instructions, data structures, program modules and other data for the processor-based device. Although not depicted, the processor-based device can employ other non-transitory computer- or processor-readable media, such as a hard disk drive, an optical disk drive, or a memory card media drive, for example.

Program modules in the processor-based devices of the Zero-day Attack Prevention Cybersecurity System and method 100 can be stored in the system memory 1708, such as an operating system 1730, one or more application programs 1732, other programs or modules 1734, drivers 1736 and program data 1738.

The application programs 1732 may, for example, include panning/scrolling 1732a. Such panning/scrolling logic may include, but is not limited to, logic that determines when or where a pointer (e.g., finger, stylus, cursor) enters a user interface element that includes a region having a central portion and at least one margin. Such panning/scrolling logic may include, but is not limited to, logic that determines a direction and a rate at which at least one element of the user interface element should appear to move, and causes updating of a display to cause the at least one element to appear to move in the determined direction at the determined rate. The panning/scrolling logic 1732a may, for example, be stored as one or more executable instructions. The panning/scrolling logic 1732a may include processor or machine executable logic or instructions to generate user interface objects using data that characterizes movement of a pointer, for example, data from a touch-sensitive display or from a computer mouse or trackball, or other user interface device.

The system memory 1708 in the processor-based devices of the Zero-day Attack Prevention Cybersecurity System and method 100 may also include communications programs 1740, for example, a server or a Web client or browser for permitting the processor-based device to access and exchange data with other systems such as user computing systems, Web sites on the Internet, corporate intranets, or other networks as described below. The communications program 1740 in the depicted implementation is markup language based, such as Hypertext Markup Language (HTML), Extensible Markup Language (XML), or Wireless Markup Language (WML) and operates with markup languages that use syntactically delimited characters added to the data of a document to represent the structure of the document. A number of servers or Web clients or browsers are commercially available such as those from Mozilla Corporation of California and Microsoft of Washington.

While shown in FIG. 17 as being stored in the system memory 1708, operating system 1730, application programs 1732, other programs/modules 1734, drivers 1736, program data 1738 and servers or browsers can be stored on any other of a large variety of non-transitory processor-readable media (e.g., hard disk drive, optical disk drive, SSD or flash memory).

A user of a processor-based device in the Zero-day Attack Prevention Cybersecurity system and method 100 can enter commands and information via a pointer, for example, through input devices such as a touch screen 1748 via a finger 1744a, stylus 1744b, or via a computer mouse or trackball 1744c which controls a cursor. Other input devices can include a microphone, joystick, game pad, tablet, scanner, biometric scanning device, and the like. These and other input devices (i.e., "I/O devices") are connected to the processor(s) 1706 through an interface 1746 such as a touch-screen controller or a universal serial bus ("USB") interface that couples user input to the system bus 1710, although other interfaces such as a parallel port, a game port, a wireless interface, or a serial port may be used. The touch screen 1748 can be coupled to the system bus 1710 via a video interface 1750, such as a video adapter, to receive image data or image information for display via the touch screen 1748. Although not shown, the processor-based device can include other output devices, such as speakers, vibrator, haptic actuator or haptic engine, and the like.

The processor-based devices of the Zero-day Attack Prevention Cybersecurity system and method 100 operate in a networked environment using one or more of the logical connections to communicate with one or more remote computers, servers or devices via one or more communications channels, for example, one or more networks 1714a, 1714b. These logical connections may facilitate any known method of permitting computers to communicate, such as through one or more LANs or WANs, such as the Internet, or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, the processor-based devices of the Zero-day Attack Prevention Cybersecurity System and method 100 may include one or more network, wired or wireless communications interfaces 1752a, 1756 (e.g., network interface controllers, cellular radios, WI-FI radios, Bluetooth radios) for establishing communications over the network, for instance, the Internet 1714a or cellular network 1714b.

In a networked environment, program modules, application programs, or data, or portions thereof, can be stored in a server computing system (not shown). Those skilled in the relevant art will recognize that the network connections shown in FIG. 17 are only some examples of ways of establishing communications between computers, and other connections may be used, including wirelessly.

For convenience, the processor(s) 1706, system memory 1708, and network and communications interfaces 1752a, 1756 are illustrated as communicably coupled to each other via the system bus 1710, thereby providing connectivity between the above-described components. In alternative implementations of the processor-based device, the above-described components may be communicably coupled in a different manner than illustrated in FIG. 17. For example, one or more of the above-described components may be directly coupled to other components, or may be coupled to each other, via intermediary components (not shown). In some implementations, system bus 1710 is omitted, and the components are coupled directly to each other using suitable connections.

Throughout this specification and the appended claims the term "communicative" as in "communicative pathway," "communicative coupling," and in variants such as "communicatively coupled," is generally used to refer to any engineered arrangement for transferring or exchanging information. Exemplary communicative pathways include, but are not limited to, electrically conductive pathways (e.g., electrically conductive wires, electrically conductive traces), magnetic pathways (e.g., magnetic media), one or more communicative link(s) through one or more wireless communication protocol(s), or optical pathways (e.g., optical fiber), and exemplary communicative couplings include, but are not limited to, electrical couplings, magnetic couplings, wireless couplings, or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other portable or wearable electronic devices, not necessarily the exemplary wearable electronic devices generally described above.

For instance, the foregoing detailed description has set forth various implementations of the devices or processes via the use of block diagrams, schematics, and examples. Insofar as such block diagrams, schematics, and examples contain one or more functions or operations, it will be understood by those skilled in the art that each function or operation within such block diagrams, flowcharts, or examples can be implemented, individually or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs executed by one or more computers (e.g., as one or more programs running on one or more computer systems), as one or more programs executed by one or more controllers (e.g., microcontrollers) as one or more programs executed by one or more processors (e.g., microprocessors, central processing units, graphical processing units), as firmware, or as virtually any combination thereof, and that designing the circuitry or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer or processor program. Logic or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic or information.

In the context of this specification, a "non-transitory processor-readable medium" can be any element that can store the program associated with logic or information for use by or in connection with the instruction execution system, apparatus, or device. The processor-readable medium can be, for example, but is not limited to, an electronic, magnetic, optical, electromagnetic, infrared, or semiconductor system, apparatus, or device. More specific examples (a non-exhaustive list) of the computer readable medium would include the following: a portable computer diskette (magnetic, compact flash card, secure digital, or the like), a random-access memory (RAM), a read-only memory (ROM), an erasable programmable read-only memory (EPROM, EEPROM, or Flash memory), a portable compact disc read-only memory (CDROM), digital tape, and other non-transitory media. The media may be distributed or a cloud-based storage media. In some embodiments, one module stored on the media is located in a first geographical location while another module stored on the media is located in a second geographical location that is remote from the first geographical location such that the media includes two or more separate and distinct memories.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification or listed in the Application Data Sheet, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A non-transitory processor-readable medium for providing a zero-day attack prevention cybersecurity system, comprising:
    an agent configured to be installed at an endpoint within a network to be evaluated, wherein the endpoint to be evaluated has a cybersecurity solution to be tested deployed therein; and
    an orchestrator configured to validate that the agent has been successfully installed, wherein the orchestrator enables standardized tactics, techniques, and procedures ("TTPs") and non-standard TTPs to be sent across the network to the endpoint, wherein the agent is configured to limit network communication outgoing from the endpoint to predefined or selected communications while the agent is installed at the endpoint, whereby the agent and the orchestrator cooperatively enable testing the cybersecurity solution of the endpoint with respect to both the standardized TTPs and the non-standard TTPs without exposing other endpoints in communication with the network to security risks posed by the standardized TTPs and the non-standard TTPs sent to the endpoint.

2. The medium of claim 1, wherein the standardized TTPs are communicated to the endpoint with packets that have a standardized artifact according to a publicly known and predefined third-party framework, wherein the non-standard TTPs are communicated to the endpoint with packets that have an artifact that is absent from the framework.

3. The medium of claim 2, wherein the artifact of the non-standard TTPs has been generated by an artificial-intelligence algorithm trained with a cybersecurity attack having a TTP that has not yet been included in the framework.

4. The medium of claim 2, wherein the non-standard TTPs includes malware having at least one artifact that has not yet been included in the framework.

5. The medium of claim 2, wherein the packets of the non-standard TTPs communicated to the endpoint are encrypted.

6. The medium of claim 1, wherein the orchestrator is configured to obtain information from the agent regarding action of the cybersecurity solution in response to the standardized TTPs and the non-standard TTPs, wherein the orchestrator is configured to communicate to a human-machine interface validation information or measurement information regarding strength of security provided to the endpoint by the cybersecurity solution based on the information obtained from the agent.

7. A method for providing a zero-day attack prevention cybersecurity system, comprising:
    installing a virtual machine at an endpoint within a network to be evaluated, wherein the endpoint to be evaluated has a cybersecurity solution to be tested deployed therein;
    installing an agent on the virtual machine;
    executing an orchestrator to validate that the agent has been successfully installed;
    based on successful installation of the agent on the virtual machine, sending under control of the orchestrator standardized tactics, techniques, and procedures ("TTPs") and non-standard TTPs to be sent across the network to the endpoint; and
    limiting by the agent network communication outgoing from the endpoint to predefined or selected communications while the agent is installed at the endpoint,
    whereby the agent and the orchestrator cooperatively enable testing the cybersecurity solution of the endpoint with respect to both the standardized TTPs and the non-standard TTPs without exposing other endpoints in communication with the network to security risks posed by the standardized TTPs and the non-standard TTPs sent to the endpoint.

8. The method of claim 7, wherein sending the standardized TTPs includes communicating the standardized TTPs to the endpoint with packets that have a standardized artifact according to a publicly known and predefined third-party framework, wherein sending the non-standard TTPs includes communicating the non-standard TTPs to the endpoint with packets that have an artifact that is absent from the framework.

9. The method of claim 8, further comprising generating the artifact of the non-standard TTPs by an artificial-intelligence algorithm trained with a cybersecurity attack having TTPs that has not yet been included in the framework.

10. The method of claim 8, wherein the non-standard TTPs includes malware having at least one artifact that has not yet been included in the framework.

11. The method of claim 8, further comprising encrypting the packets of the non-standard TTPs communicated to the endpoint.

12. The method of claim 7, further comprising:
    obtaining by the orchestrator information from the agent regarding action of the cybersecurity solution in response to the standardized TTPs and the non-standard TTPs; and
    communicating by the orchestrator to a human-machine interface validation information or measurement information regarding strength of security provided to the endpoint by the cybersecurity solution based on the information obtained from the agent.

* * * * *